United States Patent
Ebrahimi et al.

(10) Patent No.: US 10,740,584 B2
(45) Date of Patent: *Aug. 11, 2020

(54) TRANSFERRING DATA FILES USING A SERIES OF VISUAL CODES

(71) Applicant: Ping Identity Corporation, Denver, CO (US)

(72) Inventors: Armin Ebrahimi, Palo Alto, CA (US); Gaurav Khot, Cupertino, CA (US)

(73) Assignee: Ping Identity Corporation, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,411

(22) Filed: Jun. 26, 2018

(65) Prior Publication Data

US 2018/0307883 A1   Oct. 25, 2018

Related U.S. Application Data

(63) Continuation of application No. 15/208,580, filed on Jul. 12, 2016, now Pat. No. 10,007,826.

(60) Provisional application No. 62/304,934, filed on Mar. 7, 2016.

(51) Int. Cl.
| | |
|---|---|
| G06F 17/00 | (2019.01) |
| G06K 7/10 | (2006.01) |
| G06K 7/14 | (2006.01) |
| G06K 19/06 | (2006.01) |
| H04L 9/32 | (2006.01) |
| H04L 9/14 | (2006.01) |
| H04L 9/30 | (2006.01) |
| G09C 5/00 | (2006.01) |

(52) U.S. Cl.
CPC ........ *G06K 7/1439* (2013.01); *G06K 7/1095* (2013.01); *G06K 19/06037* (2013.01); *G06K 19/06112* (2013.01); *G09C 5/00* (2013.01); *H04L 9/14* (2013.01); *H04L 9/30* (2013.01); *H04L 9/3236* (2013.01); *H04L 9/3247* (2013.01); *H04L 9/3271* (2013.01)

(58) Field of Classification Search
USPC .................................. 235/375, 462.01–462.1
See application file for complete search history.

(56) References Cited

U.S. PATENT DOCUMENTS

| | | | | |
|---|---|---|---|---|
| 9,679,276 B1* | 6/2017 | Cuende | ................ | G06Q 20/065 |
| 2012/0211567 A1* | 8/2012 | Herzig | ................ | G06K 7/1093 |
| | | | | 235/488 |
| 2013/0065564 A1* | 3/2013 | Conner | ............... | G06K 19/0718 |
| | | | | 455/414.1 |

(Continued)

*Primary Examiner* — Tuyen K Vo

(57) ABSTRACT

Software on an image-capturing device iteratively captures a visual code in a series of visual codes displayed in a repeating progression on a screen of a mobile device. The visual code was generated from a display block that resulted from a partition of an original data file into a series of display blocks of at least a specified size. The software converts the visual code back into a display block and reads a header for the display block, discarding the display block if it has already been captured, as determined by the ordered identifying block number in a header. The software stops the iterative capturing when all of the display blocks in the series have been captured, as determined by the count in the header and coalesces the captured display blocks into the original data file, using an order determined by the ordered identifying block numbers.

27 Claims, 18 Drawing Sheets

(56) References Cited

U.S. PATENT DOCUMENTS

| | | | | |
|---|---|---|---|---|
| 2013/0228624 A1* | 9/2013 | Byrd | .................... | H04B 10/116 235/462.11 |
| 2014/0084067 A1* | 3/2014 | Vanderhulst | ......... | H04B 10/116 235/462.01 |

* cited by examiner

PERFORMED IN REAL TIME

PERFORMED IN REAL TIME

PERFORMED IN REAL TIME

```
┌─────────────────────────────────────────────────────────┐
│ PARTITION AN ORIGINAL DATA FILE AND A CERTIFICATE INTO  │
│ A SERIES OF DISPLAY BLOCKS OF AT LEAST A SPECIFIED SIZE │
│ AS DETERMINED BY A STANDARD FOR A VISUAL CODE, WHERE    │──3021
│ THE ORIGINAL DATA FILE AND THE CERTIFICATE HAVE BEEN    │
│           DIGITALLY SIGNED WITH A PRIVATE KEY           │
└─────────────────────────────────────────────────────────┘
                            ▼
┌─────────────────────────────────────────────────────────┐
│   ADD THE TOTAL NUMBER OF DISPLAY BLOCKS AND A          │──3022
│   BLOCK NUMBER AS A HEADER TO EACH DISPLAY BLOCK        │
└─────────────────────────────────────────────────────────┘
                            ▼
┌─────────────────────────────────────────────────────────┐
│   CONVERT EACH DISPLAY BLOCK TO A STRING AND            │──3023
│   GENERATE A SINGLE VISUAL CODE FOR THE STRING          │
└─────────────────────────────────────────────────────────┘
                            ▼
┌─────────────────────────────────────────────────────────┐
│   FOR EACH DISPLAY BLOCK IN THE SERIES, PRESENT ITS     │
│   VISUAL CODE IN A REPEATING PROGRESSION THROUGH THE    │──3024
│   SERIES DISPLAYED ON A MOBILE DEVICE                   │
└─────────────────────────────────────────────────────────┘
```

- - - - - - - - - - - - - - - - - - - - - - - - - - - - -

PERFORMED IN REAL TIME

```
┌─────────────────────────────────────────────────────────┐
│   ITERATIVELY CAPTURE A VISUAL CODE                     │
│   FROM THE MOBILE DEVICE USING AN                       │──3031
│   IMAGE-CAPTURING DEVICE                                │
└─────────────────────────────────────────────────────────┘
                            ▼
┌─────────────────────────────────────────────────────────┐
│ CONVERT THE VISUAL CODE BACK INTO A STRING AND DISCARD THE STRING │
│ IF IT IS A DUPLICATE; OTHERWISE REMOVE THE HEADER, RECORD THE BLOCK│──3032
│ NUMBER, AND CONVERT THE STRING BACK INTO TO A DISPLAY BLOCK │
└─────────────────────────────────────────────────────────┘
                            ▼
┌─────────────────────────────────────────────────────────┐
│   STOP CAPTURING WHEN THE TOTAL NUMBER OF DISPLAY BLOCKS│──3033
│   EQUALS THE NUMBER OF BLOCK NUMBERS                    │
└─────────────────────────────────────────────────────────┘
                            ▼
┌─────────────────────────────────────────────────────────┐
│   COALESCE THE DISPLAY BLOCKS INTO AN ORIGINAL DATA     │──3034
│   FILE USING THE ORDER DETERMINED BY THE BLOCK NUMBERS  │
└─────────────────────────────────────────────────────────┘
                            ▼
┌─────────────────────────────────────────────────────────┐
│   HASH ANOTHER COPY OF THE ORIGINAL DATA FILE AND       │
│   ANOTHER COPY OF THE CERTIFICATE AND USE THEM AND      │
│   THE MATCHING PUBLIC KEY TO VERIFY (1) THE SIGNED      │──3035
│   ORIGINAL DATA FILE AND CERTIFICATE AND (2) THE DIGITAL│
│   SIGNATURE, USING A VERIFICATION ALGORITHM             │
└─────────────────────────────────────────────────────────┘
```

Figure 3G

501
HEADER:
    (0, 10)
    (1, 10)
    (2, 10)
    (3, 10)
    (4, 10)
    (5, 10)
    (6, 10)
    (7, 10)
    (8, 10)
    (9, 10)
Figure 5A
I. 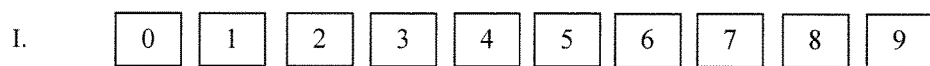
II. 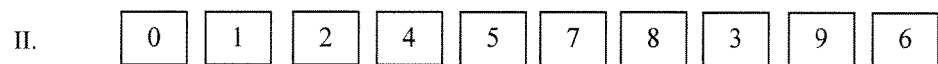
TIME 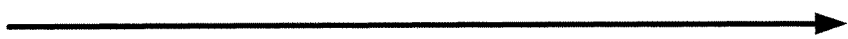
III. 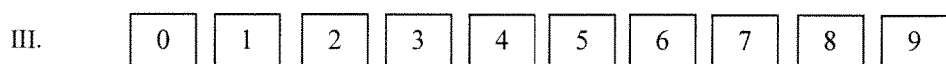
Figure 5B

TRANSFERRING DATA FILES USING A SERIES OF VISUAL CODES

RELATED APPLICATIONS

This application is a continuation of and claims priority to and the benefit of U.S. patent application Ser. No. 15/208,580, filed on Jul. 12, 2016, entitled "Transferring Data Files Using a Series of Visual Codes", now U.S. Pat. No. 10,007,826; which claims priority to and the benefit of U.S. Provisional Patent Application No. 62/304,934, filed on Mar. 7, 2016, entitled "An Identity Management Service Using a Blockchain," the disclosure of each application identified above being incorporated by reference in its entirety for all purposes.

RELATED APPLICATIONS

This application is related to U.S. patent application Ser. No. 15/146,872, entitled "Identity Management Service Using a Block Chain Providing Identity Transactions Between Devices", filed on May 4, 2016; U.S. patent application Ser. No. 15/146,872, entitled "Identity Management Service Using a Block Chain Providing Identity Transactions Between Devices", filed on May 4, 2016; U.S. patent application Ser. No. 15/146,881, entitled "Identity Management Service Using a Block Chain Providing Identity Certification Transactions Between Devices", filed on May 4, 2016; PCT Application No. PCT/US16/30863, entitled "Identity Management Service Using a Block Chain Providing Interaction Transactions Between Devices", filed on May 4, 2016; and U.S. patent application Ser. No. 15/147,838, entitled "User Identification Management System and Method", filed on May 5, 2016. The disclosure of each of the applications identified above is incorporated herein by reference for all purposes.

BACKGROUND

When two devices are incompatible or lack access to a connecting network, data transfer between them might still be possible using displayed and captured visual codes such as a QR code, a PDF417 code, etc.

However, the standards for visual codes employ maximum data limits which are smaller than the size of many image files or files containing non-image biometric data, which are often used to prove identity, e.g., to law enforcement officials or airlines.

SUMMARY

In an example embodiment, a method is described. According to the method, software on an image-capturing device iteratively captures a visual code in a series of visual codes displayed in a repeating progression on a screen of a mobile device. The visual code was generated from a display block that resulted from a partition of an original data file into a series of display blocks of at least a specified size. Each display block has a header that includes an ordered identifying block number and a count of the display blocks in the series. The software converts the visual code back into a display block and reads a header for the display block, discarding the display block if it has already been captured, as determined by the ordered identifying block number in the header. The software removes the header of the display block and records the ordered identifying block number, if the display block has not been discarded. The software stops the iterative capturing when all of the display blocks in the series have been captured, as determined by the count in the header and coalesces the captured display blocks into the original data file, using an order determined by the ordered identifying block numbers. Then the software compares the original data file with a copy of the original data file obtained from another source, in an example embodiment.

In another example embodiment, another method is described. According to the method, software on a mobile device partitions an original data file into a series of display blocks of at least a specified size. Then the software adds a header to each display block. The header includes an ordered identifying block number and a count of the display blocks in the series. The software generates a visual code for each display block. And the software iteratively presents each of the visual codes in the series in a repeating progression displayed on a screen of a mobile device for capture by an image-capturing device which converts each visual code back into a display block and coalesces the captured display blocks into the original data file, using an order determined by the ordered identifying block numbers.

In another example embodiment, another method is described. According to the method, software on an image-capturing device iteratively captures a QR code in a series of QR codes displayed in a repeating progression on a screen of a mobile device. The QR code was generated from a display block that resulted from a partition of an original data file which had been digitally signed with a private key into a series of display blocks of at least a specified size. Each display block has a header that includes an ordered identifying block number and a count of the display blocks in the series. The software converts the QR code back into a display block and reads a header for the display block, discarding the display block if it has already been captured, as determined by the ordered identifying block number in the header. The software removes the header of the display block and records the ordered identifying block number, if the display block has not been discarded. The software stops the iterative capturing when all of the display blocks in the series have been captured, as determined by the count in the header and coalesces the captured display blocks into the original data file, using an order determined by the ordered identifying block numbers. Then the software hashes a copy of the original data file and uses the hashed copy and a public key matching the private key to verify the original data file that had been digitally signed and the digital signing.

Other aspects and advantages of the inventions will become apparent from the following detailed description, taken in conjunction with the accompanying drawings, which illustrate by way of example the principles of the inventions.

BRIEF DESCRIPTION OF THE DRAWINGS

FIG. 3G is a flowchart of a process for transferring a digitally-signed original data file (e.g., an image file) and certificate from a mobile device to an image-capturing device, in accordance with an example embodiment.

FIG. 5A illustrates a series of headers that might be used when partitioning an original data file (e.g., an image file), in accordance with an example embodiment.

FIG. 5B illustrates a process for capturing a series of blocks, in accordance with an example embodiment.

DETAILED DESCRIPTION

Figure 1A:
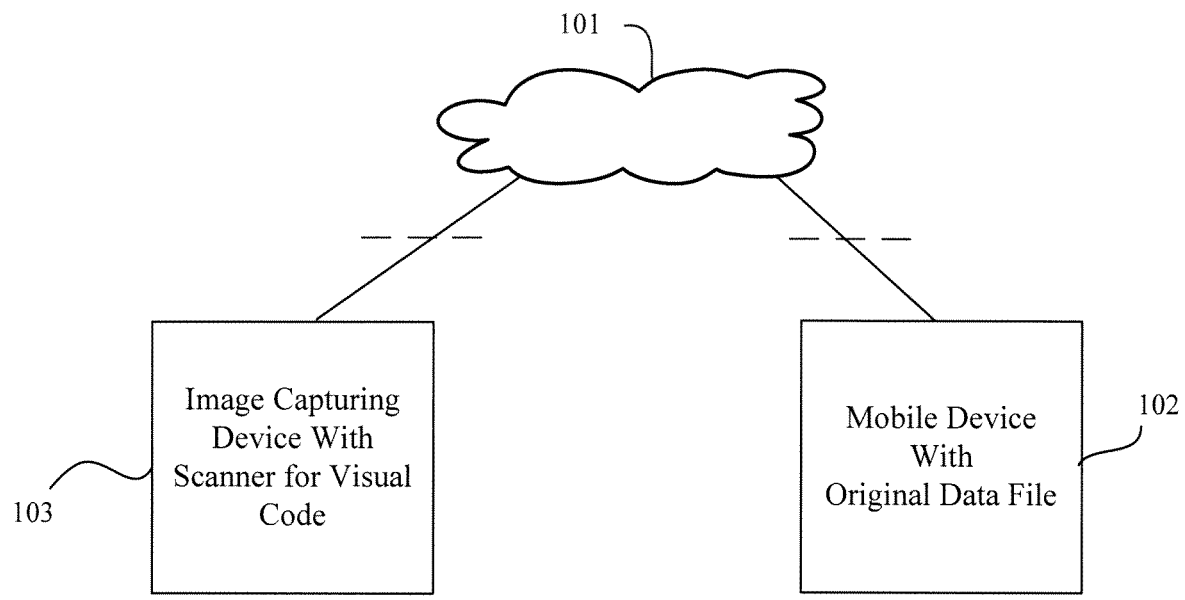
FIG. 1A is a use-case diagram, in accordance with an example embodiment.

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

It is desirable for two devices to communicate with one another even if there is no connectivity between the devices. The assumption is that the devices have no internet connectivity, Wi-Fi connectivity, compatible Bluetooth, NFC, or other communication capability. This might be the case if the devices are from different manufacturers (e.g., Apple and Samsung running iOS and Android, respectively) or if they are in a location where there is no connectivity option available. For example, one user may be met with a police officer who wishes to share the individuals' data, but they are in a faraway mountainous area without connectivity. Another example is when an individual travels to another country and doesn't have connectivity. This is also common when a passenger wants to share a digital identity when traveling to another country where he/she does not have internet coverage.

Small sets of data can be passed by creating a QR code (or equivalent) on one device and having a second device scan that QR code (or equivalent). However, such codes are typically limited in size and usually carry up to a maximum of 2 k or 4 k bytes of data. If a user wishes to share larger sets of data, such as images of a drivers' license, image of a passport, meta-data about the user, a selfie image of the user or other such data that usually requires larger sets of data, using a QR Code or equivalent typically cannot accommodate the need.

To accommodate this need, the user intending to send data might use software (e.g., a mobile-device app) to break up the large data set into smaller chunks that can each fit into a smaller QR Code (or equivalent). Each block needs to be appended with sufficient control information so that it is uniquely identified as the given block in the sequence of blocks. For example, a 20 k block of data can be broken up into 10 2 k blocks and each block can have a reference number of the block number it belongs to and a count of the total blocks. Some of the information might be maintained in the first block or repeated in each block. Hence, a block of data in its simplest form might have the form:

<block-number>,<total-blocks>.<data>

Any form of syntax might be used to separate out the fields. In this example, commas and periods are used, but any equivalent format can be utilized. The sender might use a mobile-device app to rotate between each QR code and display each one briefly. When the last QR code is displayed, the mobile-device app might rotate again and begin from the first QR code and continuously loop so long as the data is being shared and until the user closes the code-display screen. The mobile-device app swapping through the QR codes might determine how quickly the QR codes rotate. A number of variables can influence the speed that the mobile-device app might rotate the QR codes. For example, if the quality of scanner is good in terms of accuracy, then the speed of rotation might be greater and/or the block sizes might be denser (which results in fewer blocks being needed to pass the entire data).

On the receiving side, software on the second device must then scan the screen of the first device with the QR codes until all blocks are read. It is most likely that the blocks will not be scanned in sequence as the scanner may skip some blocks and will need to pick them up on a subsequent rotation. The software on the second device must keep track of the total blocks and account for each unique block that has been read. Once all blocks are accounted for, it can assemble the data of the blocks together according to their sequence numbers and form one single data block that represents the original data set that the sender had sent over.

The assumption in a secure-envelope exchange is that the two users already know one another and are aware of each other's SealId, e.g., an identifier that identifies a user for purposes of identification software, e.g., which might be distributed as a mobile-device app. Additionally, each of the two users will have access to the public key associated with the private key which the other user used to seal his/her identification. User A intends to send a block of data to User B. User A places that data in a data block and may add additional identification fields to that block of data such as timestamp, the User A's own SealId, User B's SealId, User A's public key and, if there is a session between the two, a sessionId. The value of the timestamp and the sessionId is to ensure vitality of the data block versus one that may have been created and somehow reused again. This data block will be referred to as <dataBlock>. Next, User A uses his/her own private key to digitally sign the <dataBlock> that was created. The result is <envelopeSignature>. Next, an <envelopeContent> is created by putting together the <dataBlock> and the <envelopeSignature>. Then, a <secureEnvelope> is created by encrypting the <envelopeContent> with User B's public key. This secure envelope can now be transmitted to user B directly. User B can view the <envelopeContent> by decrypting the <secureEnvelope> using his/her private key that no one else has access to. User B might then verify the <dataBlock> in the envelope content by verifying the <dataBlock> and the <envelopeSignature> with the User A's public key that was passed. User B might also verify that this is the same public key that was used in User A's SealId. There is no restriction as to how User A passes the secure envelope to User B. It can be done via email, a text message, NFC, or any other form of digital communication where the data can be passed, including through the visual codes described in the present application. Because it is encrypted using User B's public key, only User B can view the message and no other user can modify it either. In fact, after the secure envelope is created, even User A can no longer view its content.

FIG. 1A shows a use-case diagram, in accordance with an example embodiment. As depicted in the figure, two devices, 102 and 103, are proximate to each other but have no network connection between them, due to device incompatibility, lack of network support, suppression of network support, etc.; this is indicated by the dashed lines crossing the lines connecting the devices to the network 101.

In an example embodiment, device 102 is a mobile device such as a smartphone on which an original data file (e.g., an image file) is stored, e.g., in volatile memory or persistent storage, and device 103 is an image-scanning device such as a smartphone, a kiosk, a handheld scanner, etc. Also, in an example embodiment, device 102 includes functionality (e.g., hardware, firmware, and/or software) for converting a data file into a QR code such as a 1-D barcode, a 2-D (or matrix) barcode, a 3-D barcode, etc. And device 103 includes functionality (e.g., hardware, firmware, and/or software) for capturing (or scanning) a visual code such as a 1-D barcode, a 2-D (or matrix) barcode, a 3-D barcode, etc. Examples of 2-D (or matrix) barcodes which might be used with the example embodiments described herein include: Aztec Code, Code 1, ColorCode, Color Construct Code, CrontoSign, CyberCode, d-touch, DataGlyphs, Data Matrix, Dastastrip Code, digital paper, EZcode, High Capacity Color Barcode, Han Xin Barcode, HueCode, InterCode, MaxiCode, MMCC, NexCode, Nintendo e-Reader Dot code, PDF417, Qode, QR code, ShotCode, SPARQCode, and VOICEYE.

More generally, devices 102 and 103 might include (1) hardware consisting of one or more microprocessors and/or microcontrollers (e.g., from the ARM family or the x86 family), volatile storage (e.g., RAM), and persistent storage (e.g., flash memory such as microSD) and (2) an operating system (e.g., Android, iOS, Chrome OS, Windows Phone, Linux, Firefox OS, etc.) that runs on the hardware. Additionally, devices 102 and 103 might include a screen capable of displaying a visual code (e.g., a 2D or matrix barcode) and a camera or barcode scanner capable of capturing a visual code (e.g., a 2D or matrix barcode).

In an example use case, a law enforcement officer in a patrol car might pull over a driver in a remote location. The driver might be the user of device 102, a smartphone, and the original data file might be an image file depicting the driver which was taken by a DMV (Department of Motor Vehicle) official, e.g., for a driver license. The law enforcement officer might be the user of device 103, which is also a smartphone, which might have network connectivity to physical storage in the patrol car storing a database of DMV images for drivers licensed in a jurisdiction. Or the patrol car might have network connectivity to a public or private block-chain database storing DMV images for drivers licensed in a jurisdiction. The law enforcement officer may not have any connectivity to his patrol vehicle or an internet, but may still wish to extract the driver license information from the driver via device 102 for partial validation.

In another example use case, the user of device 102, a smartphone, might be a traveler and the original data file might be an image file depicting the traveler which was taken for a state department, e.g., for a passport. Device 103 might be an airline kiosk, which might have network connectivity to physical storage at the airline or at the state department storing a database of passport images for a jurisdiction. In an example embodiment, the database might be a public or private block-chain database storing passport images for a jurisdiction.

Figure 1B:
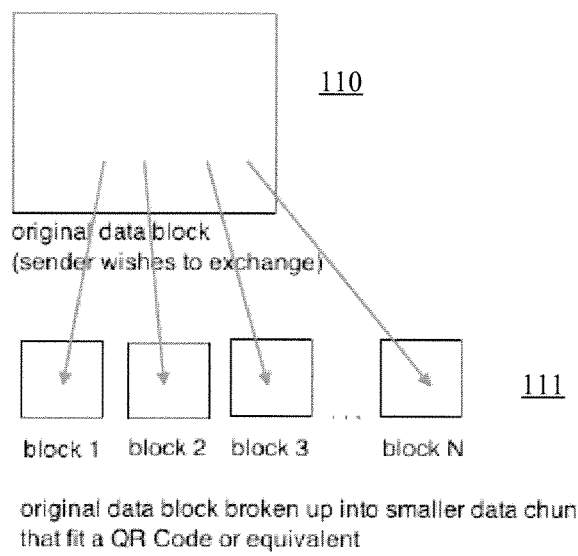
FIG. 1B illustrates a partitioning of a data block into an ordered series of smaller data blocks, in accordance with an example embodiment.

FIG. 1B shows a partitioning of an original data file (or data block) into an ordered series of smaller data blocks, in accordance with an example embodiment. As depicted in the figure, the original data file 110 is partitioned into N display blocks 111, each of which can be converted into a visual code such as a QR code. In this regard, it will be appreciated that a 101×101 QR code, with high level error correction, can hold 3248 bits, or 406 bytes. And a 177×177 QR code, depending on desired level of error correction, can store between 1273 and 2953 bytes.

Figure 2A:
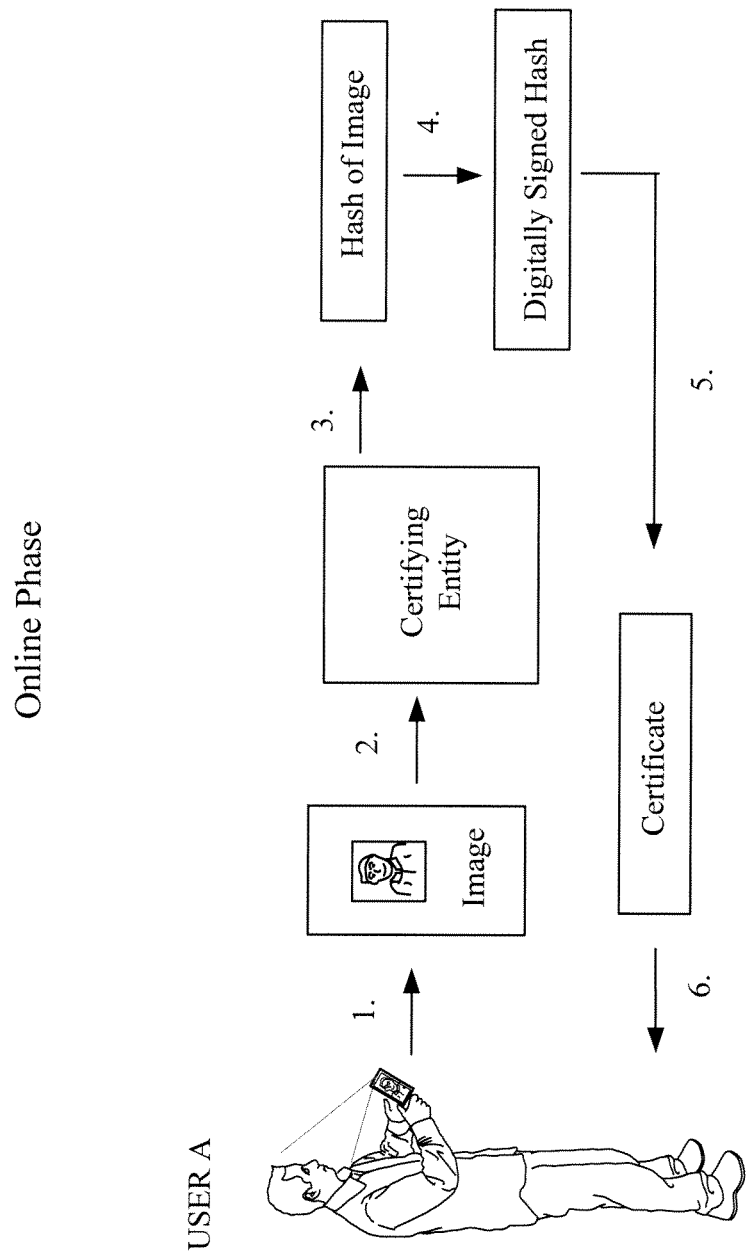
FIG. 2A is a diagram showing an online phase for a use case, in accordance with an example embodiment.

FIG. 2A is a diagram showing an online phase for a use case, in accordance with an example embodiment. In this use case, USER A is the user of a mobile device and takes an image of himself/herself (e.g., a selfie), in operation 1. In operation 2, USER A sends the image to a certifying entity, e.g., an airline, a department of motor vehicles, a state department, etc. In an example embodiment, USER A might use the secure envelopes procedure described earlier when sending the image to the certifying entity. In operation 3, the certifying entity hashes the image and digitally signs the hash, e.g., using the certifying entity's private key, in operation 4. Then in operation 5, the certifying entity adds certifying data (e.g., a timestamp, a block-chain identifier, etc.) to the signed hash to create a certificate and sends the certificate to USER A (e.g., using a secure envelope), in operation 6. In an example embodiment, the certifying entity might also send USER A a public key associated with the private key that was used to digitally sign the hash. As indicated in the figure, all of the operations shown in the figure might be handled online and facilitated by networks.

Figure 2B:
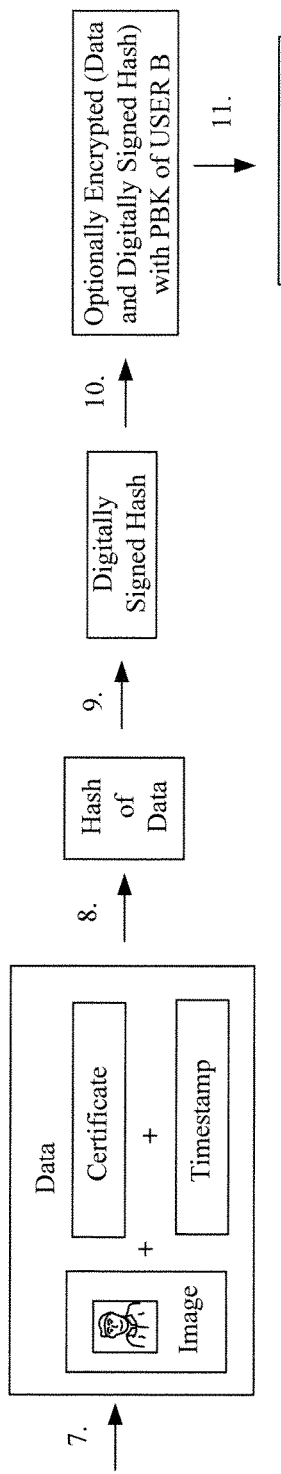
FIG. 2B is a diagram showing an offline phase for a use case, in accordance with an example embodiment.
Figure 2B:
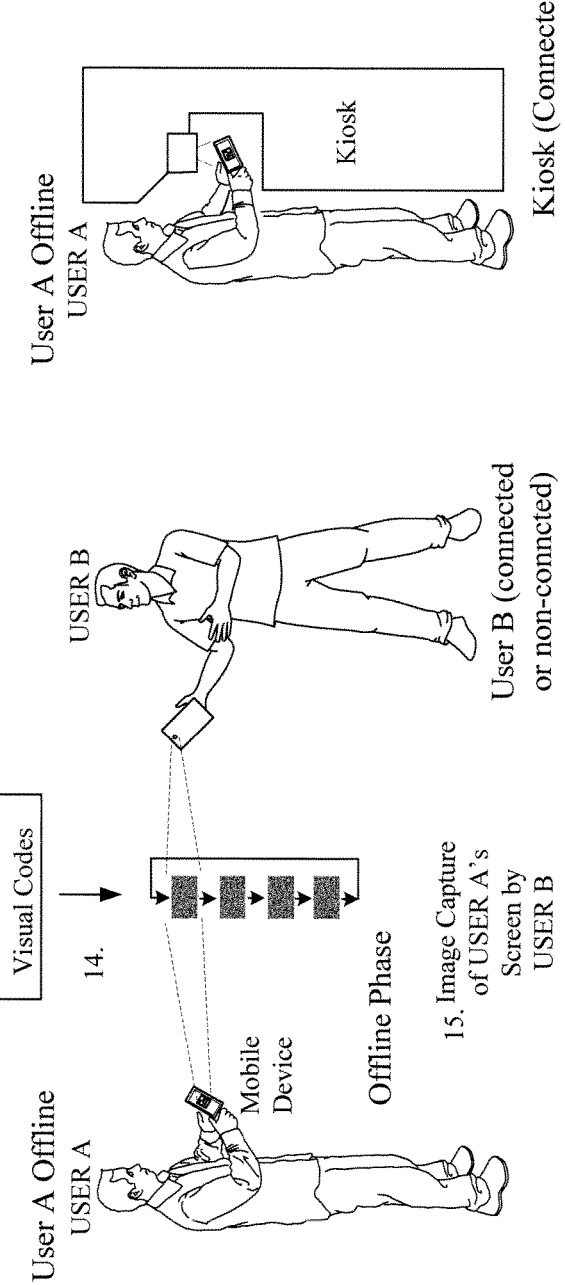

FIG. 2B is a diagram showing an offline phase for the use case, in accordance with an example embodiment. This figure depicts a continuation of the use case in FIG. 2A. As indicated in the figure, USER A receives the certificate from the certifying entity, in operation 7, during the last operation in the online phase, and combines the certificate with the image and optionally, a timestamp in a data file (or other data block). In operation 8, USER A hashes the data file and then digitally signs the hash in operation 9, using USER A's private key. In operation 10, USER A optionally encrypts the data file and the signed hash, using USER B's public key. Then in operation 11, software on USER A's mobile device partitions the encrypted or non-encrypted data file and hash into a number of display blocks, where the size of each of the display blocks is less than the maximum size specified for a visual code, e.g., a QR code. Then in operation 12, the software adds a header to each of the display blocks and, in operation 13, generates a single visual code for each display block. In operation 14, the visual codes are displayed on a screen (e.g., a touchscreen) on USER A's mobile device, e.g., as described in the processes below. And in operation 15, USER B uses his/her mobile device to capture the visual codes, which are coalesced back into the data file by software on USER B's mobile device. As indicated in the figure, operations 8 through 15 might be performed offline without a facilitating network, in an example embodiment. In alternative use cases also depicted in FIG. 2B, USER A (e.g., standing at a kiosk) and/or USER B might be connected to a network (e.g., a local area network (LAN), a wide area network (WAN) including the Internet, a network which might be wireless in part or in whole, etc.).

Figure 2C:
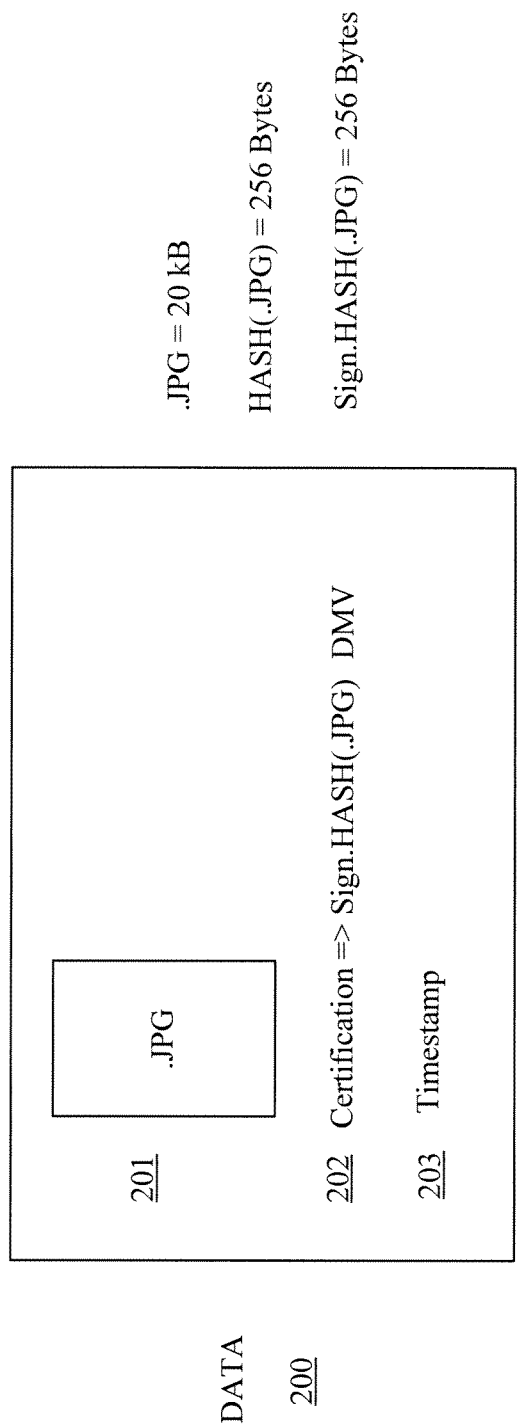
FIG. 2C is diagram showing byte sizes for items of data in a data file, in accordance with an example embodiment.

FIG. 2C is diagram showing byte sizes for items of data in a data file, in accordance with an example embodiment. As indicated in the figure, the data file (or other data collection) might include an image file 201, a certificate 202 which includes a signed hash, and a timestamp 203. By way of illustration and not by way of limitation, the size of the image file might be approximately 20 kilobytes (kB) and the size of the certificate might be approximately 256 bytes. In other example embodiments, the size of the image file might be relatively greater or smaller than the size in this example and the size of the certificate might be relatively greater or smaller than the size in this example.

Figure 3A:
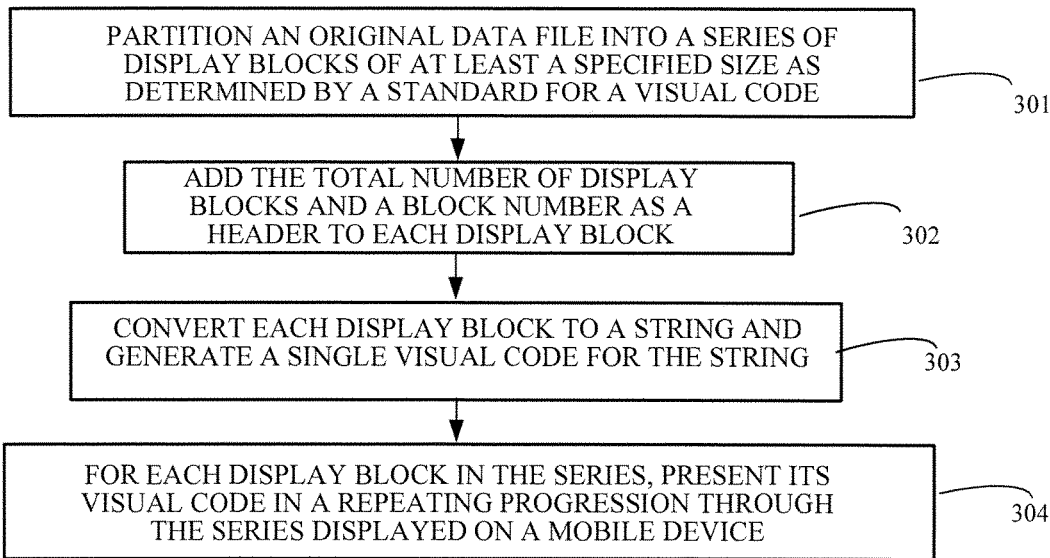
FIG. 3A is a flowchart of a process for transferring an original data file (e.g., an image file) from a mobile device to an image-capturing device, in accordance with an example embodiment.
Figure 3A:
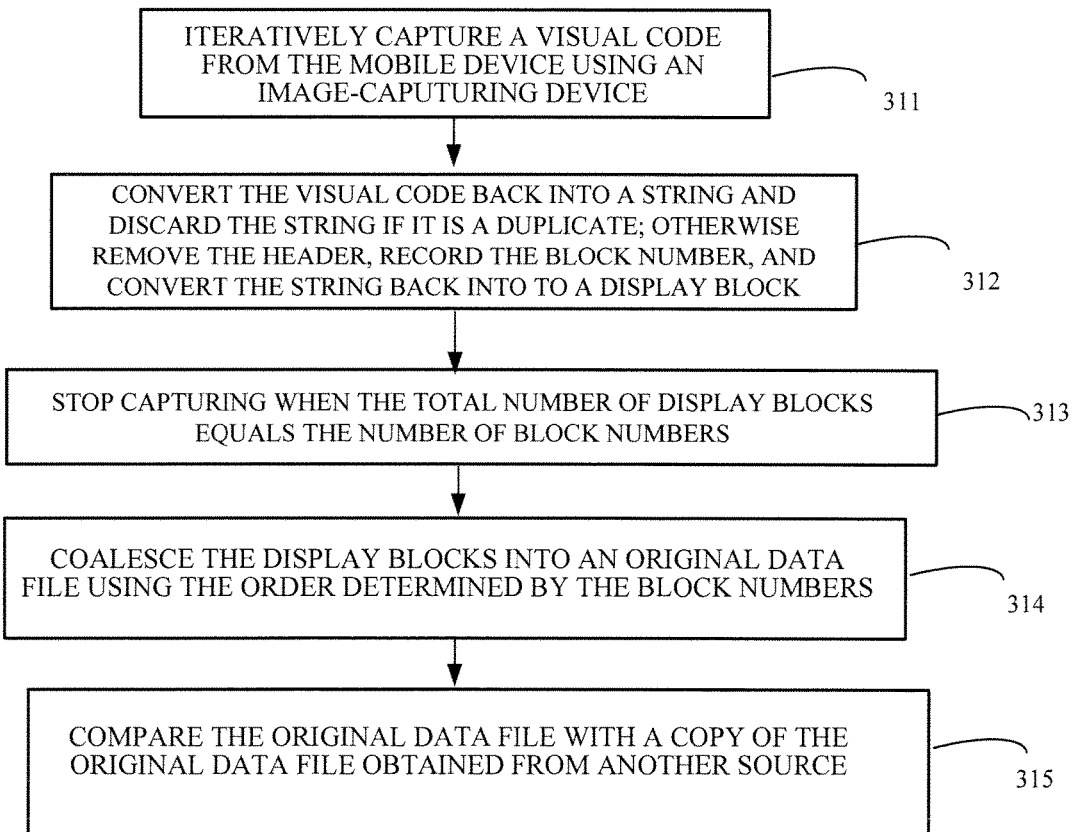

FIG. 3A is a flowchart of a process for transferring an original data file (e.g., an image file) from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 3A, software on a mobile device (e.g., mobile device 102 in FIG. 1A, which might be smartphone) partitions an original data file (e.g., an image file) into a series of display blocks of at least a specified size, e.g., as determined by the size limitations of a standard for a visual code such a QR code, in operation 301. Then in operation 302, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 303, the software converts each block to a string and generates a single visual code (e.g., a QR code) for the string, in an example embodiment. Then in operation 304, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 3A (at the bottom of the figure below the dashed dividing line), software on an image-scanning device (e.g., image-scanning device 103 in FIG. 1A, which might be a smartphone, a kiosk, a handheld scanner, etc.) iteratively captures a visual code from the mobile (or sending) device, in operation 311. Then in operation 312, that software converts the visual code back into a string and discards the string if it is a duplicate. Otherwise the software removes the header, records the block number, and converts the string back into to a display block, in an example embodiment. In operation 313, the software stops capturing when the total number of blocks equals the number of block numbers and, in operation 314, the software coalesces (or combines) the display blocks into an original data file (e.g., an image file) using the order determined by the block numbers, in an example embodiment. And in operation 315, the software compares the original data file (e.g., an image file) with a copy (e.g., an identical copy) of the original data file (e.g., an image file) obtained from another source, e.g., a state department of motor vehicles, the U.S. State Department, the Federal Bureau of Investigations, a block chain, an airline, etc., in an example embodiment.

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block. In other examples, the original data may be converted into another format before transfer such as base64, base128, Hex, Octal, or other formats that allow binary data to be represented in ASCII format.

Moreover, in an example embodiment the original data file might not be an image file. Rather the original data file might be non-image biometric data concerning the user of the mobile device, e.g., fingerprint, voice data, and/or genetic-identification data.

Figure 3B:
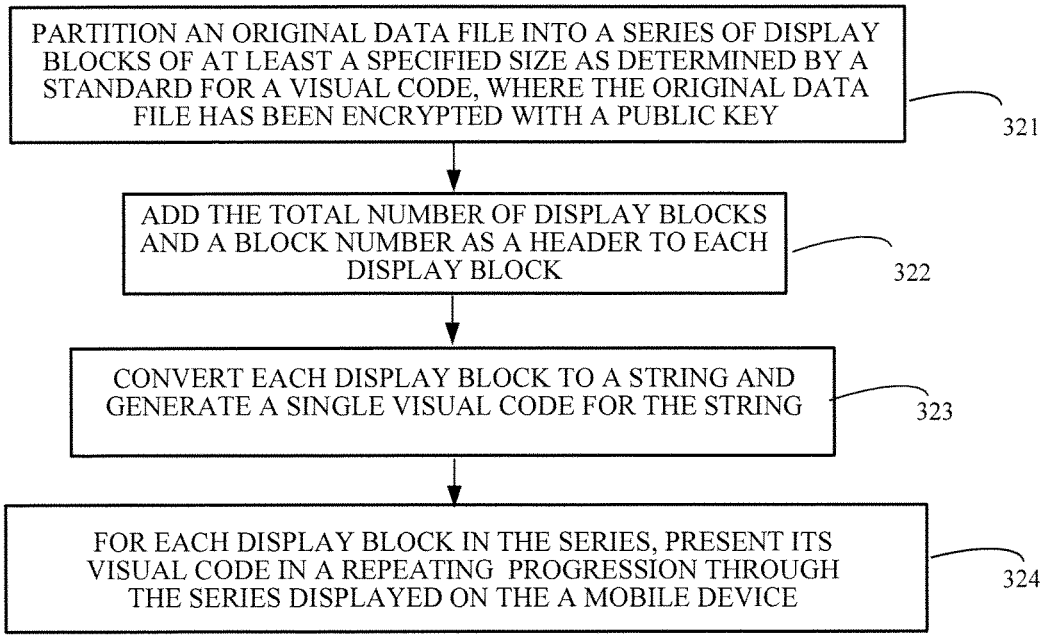
FIG. 3B is a flowchart of a process for transferring an encrypted original data file (e.g., an image file) from a mobile device to an image-capturing device, in accordance with an example embodiment.
Figure 3B:
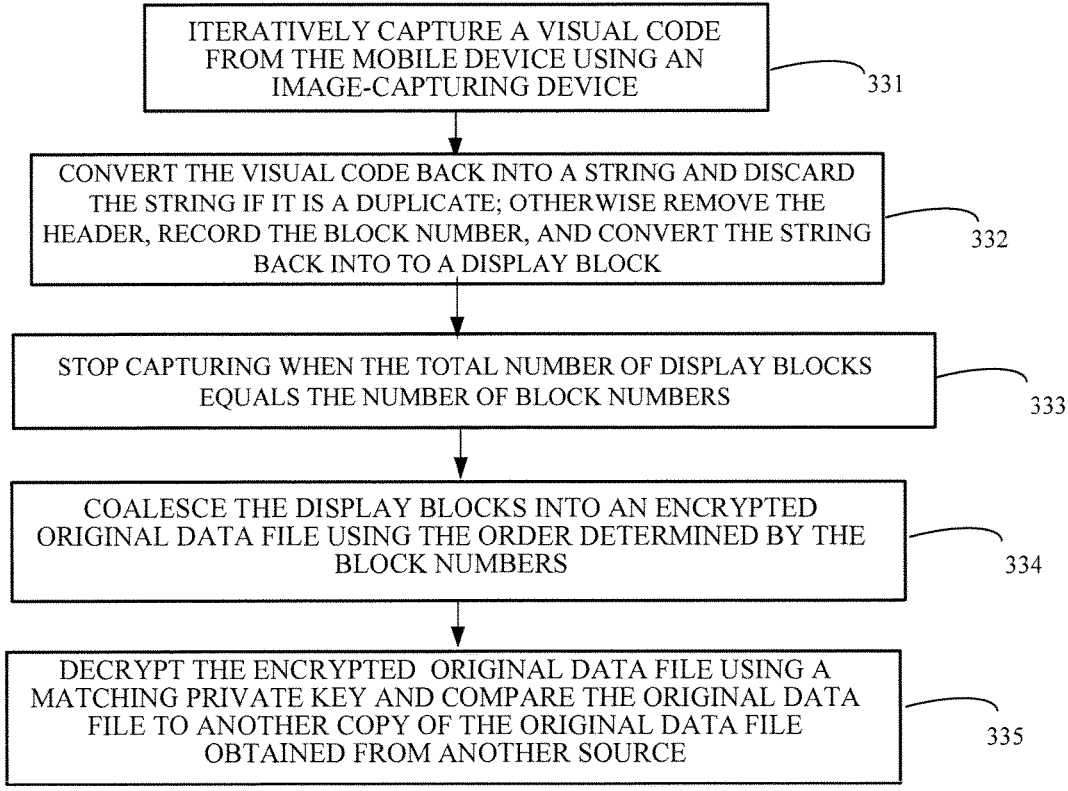

FIG. 3B is a flowchart of a process for transferring an encrypted original data file (e.g., an image file) from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 3B, software on a mobile device (e.g., mobile device 102 in FIG. 1A, which might be smartphone) partitions an original data file (e.g., an image file) into a series of blocks of at least a specified size, e.g., as determined by the size limitations of a standard for a visual code such a QR code, in operation 321. The original data file (e.g., an image file) has been encrypted with a public key, e.g., the public key of the user of the image-capturing device. In operation 322, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 323, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 324, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 3B (at the bottom of the figure below the dashed dividing line), software on an image-scanning device (e.g., image-scanning device 103 in FIG. 1A, which might be a smartphone, a kiosk, a handheld scanner, etc.) iteratively captures a visual code from the mobile (or sending) device, in operation 331. Then in operation 332, that software converts the visual code back into a string and discards the string if it is a duplicate. Otherwise the software removes the header, records the block number, and converts the string back into to a display block, in an example embodiment. In operation 333, the software stops capturing when the total number of display blocks equals the number of block numbers and, in operation 334, the software coalesces (or combines) the display blocks into an original data file (e.g., an image file) using the order determined by the block numbers, in an example embodiment. And in operation 335, the software decrypts the encrypted original data file (e.g., an image file) using a private key that matches the public key used to encrypt the original data file (e.g., an image file) and compares the original data file (e.g., an image file) with a copy (e.g., an identical copy) of the original data file (e.g., an image file) obtained from another source, e.g., a state department of motor vehicles, the U.S. State Department, the Federal Bureau of Investigations, a block chain, an airline, etc.

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

Figure 3C:
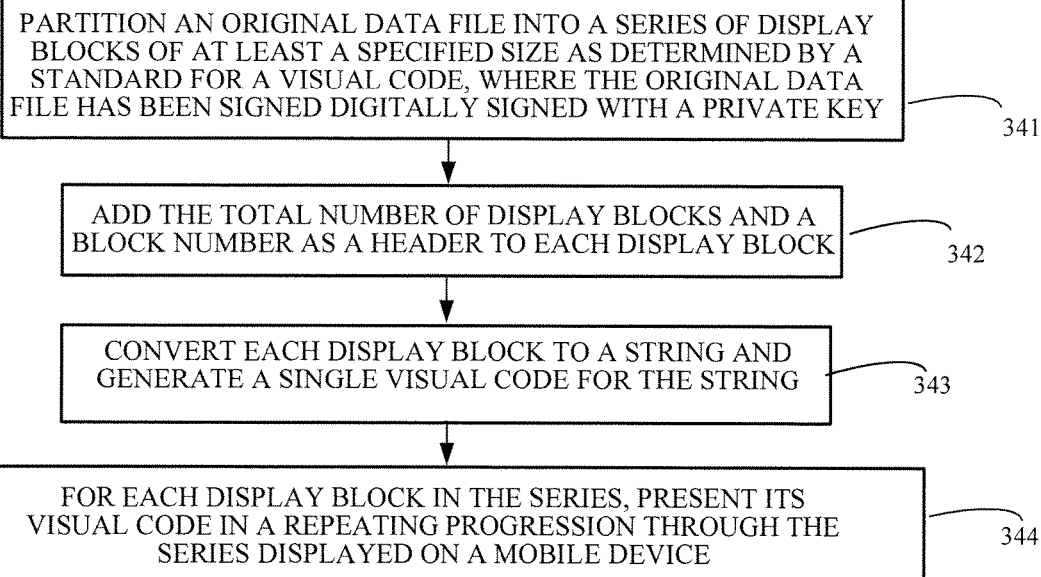
FIG. 3C is a flowchart of a process for transferring a digitally-signed original data file (e.g., an image file) from a mobile device to an image-capturing device, in accordance with an example embodiment.
Figure 3C:
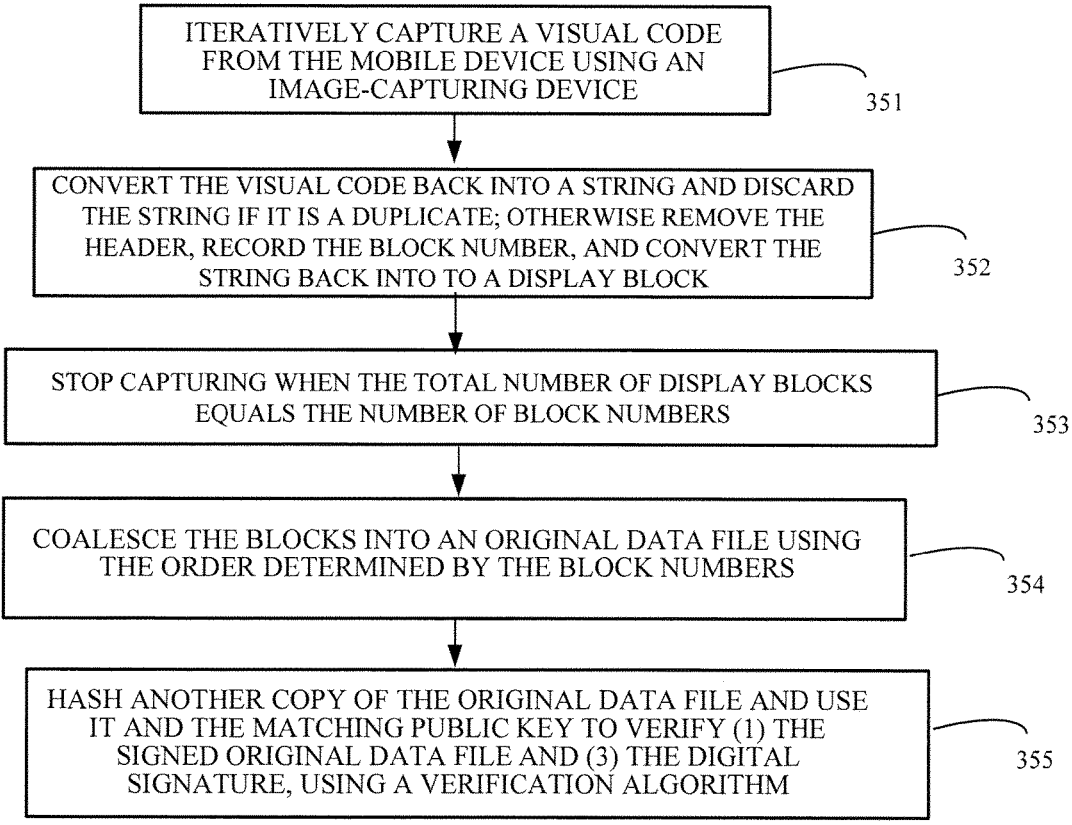

FIG. 3C is a flowchart of a process for transferring a digitally-signed original data file (e.g., an image file) from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 3C, software on a mobile device (e.g., mobile device 102 in FIG. 1A, which might be smartphone) partitions an original data file (e.g., an image file) into a series of display blocks of at least a specified size, e.g., as determined by the size limitations of a standard for a visual code such a QR code, in operation 341. The original data file (e.g., an image file) has been digitally signed with a private key, e.g., the private key of the user of the mobile device. In operation 342, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 343, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 344, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 3C (at the bottom of the figure below the dashed dividing line), software on an image-scanning device (e.g., image-scanning device 103 in FIG. 1A, which might be a smartphone, a kiosk, a handheld scanner, etc.) iteratively captures a visual code from the mobile (or sending) device, in operation 351. Then in operation 352, that software converts the visual code back into a string and discards the string if it is a duplicate. Otherwise the software removes the header, records the block number, and converts the string back into to a display block, in an example embodiment. In operation 353, the software stops capturing when the total number of display blocks equals the number of block numbers and, in operation 354, the software coalesces (or combines) the display blocks into an original data file (e.g., an image file) using the order determined by the block numbers, in an example embodiment. And in operation 355, the software hashes another copy of the original data file (e.g., an image file) and uses it and the public key that matches the private key used to digitally sign the original data file (e.g., an image file) to verify (1) the signed original data file (e.g., an image file) and (2) the digital signature, using a verification algorithm (e.g., the RSA verification algorithm).

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

Figure 3D:
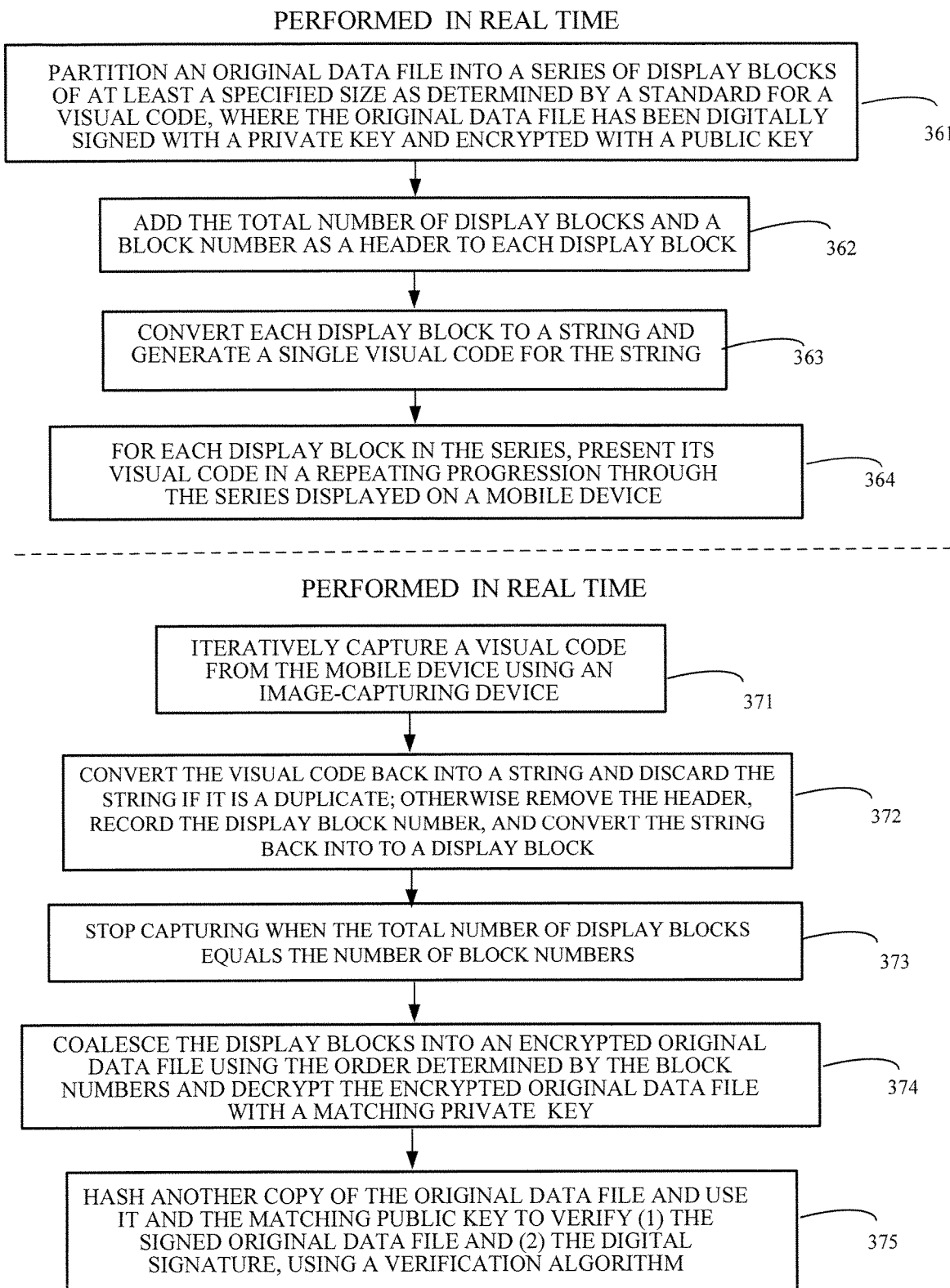
FIG. 3D is a flowchart of a process for transferring a digitally-signed and encrypted original data file (e.g., an image file) from a mobile device to an image-capturing device, in accordance with an example embodiment.

FIG. 3D is a flowchart of a process for transferring an encrypted and digitally-signed original data file (e.g., an image file) from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 3D, software on a mobile device (e.g., mobile device 102 in FIG. 1A, which might be smartphone) partitions an original data file (e.g., an image file) into a series of display blocks of at least a specified size, e.g., as determined by the size limitations of a standard for a visual code such a QR code, in operation 361. The original data file (e.g., an image file) has been digitally signed with a private key, e.g., the private key of the user of the mobile device, and encrypted with a public key, e.g., the public key of the user of the image-capturing device. In operation 362, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 363, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 364, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 3D (at the bottom of the figure below the dashed dividing line), software on an image-scanning device (e.g., image-scanning device 103 in FIG. 1A, which might be a smartphone, a kiosk, a handheld scanner, etc.) iteratively captures a visual code from the mobile (or sending) device, in operation 371. Then in operation 372, that software converts the visual code back into a string and discards the string if it is a duplicate. Otherwise the software removes the header, records the block number, and converts the string back into to a display block. In operation 373, the software stops capturing when the total number of display blocks equals the number of block numbers. In operation 374, the software coalesces (or combines) the display blocks into an original data file (e.g., an image file) using the order determined by the block numbers and decrypts the original data file (e.g., an image file) with a private key that matches the public key that was used encrypt the original data file (e.g., an image file), in an example embodiment. Then in operation 375, the software hashes another copy of the original data file (e.g., an image file) and uses it and the public key that matches the private key used to digitally sign the original data file (e.g., an image file) to verify (1) the signed original data file (e.g., an image file) and (2) the digital signature, using a verification algorithm (e.g., the RSA verification algorithm).

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

Figure 3E:
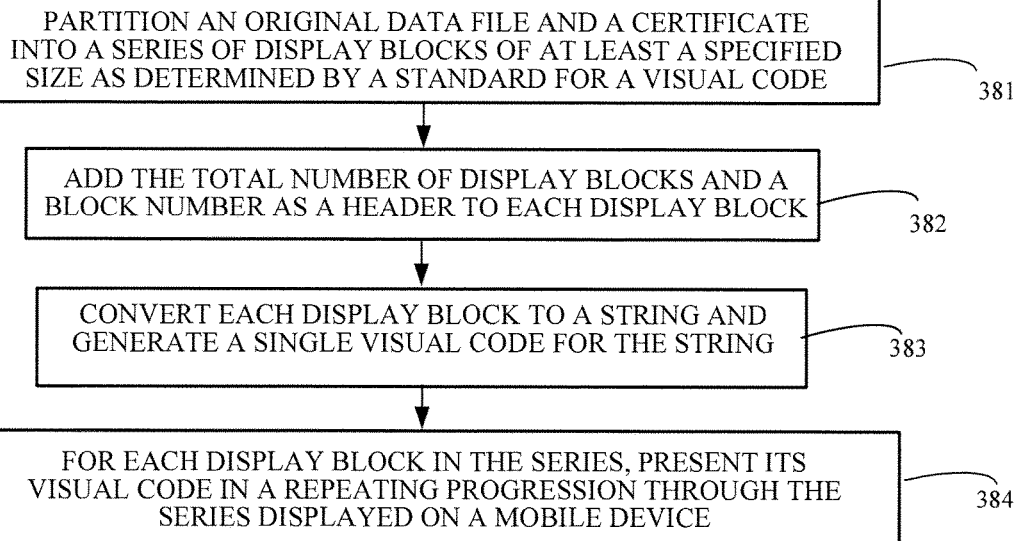
FIG. 3E is a flowchart of a process for transferring an original data file (e.g., an image file) and a certificate from a mobile device to an image-capturing device, in accordance with an example embodiment.
Figure 3E:
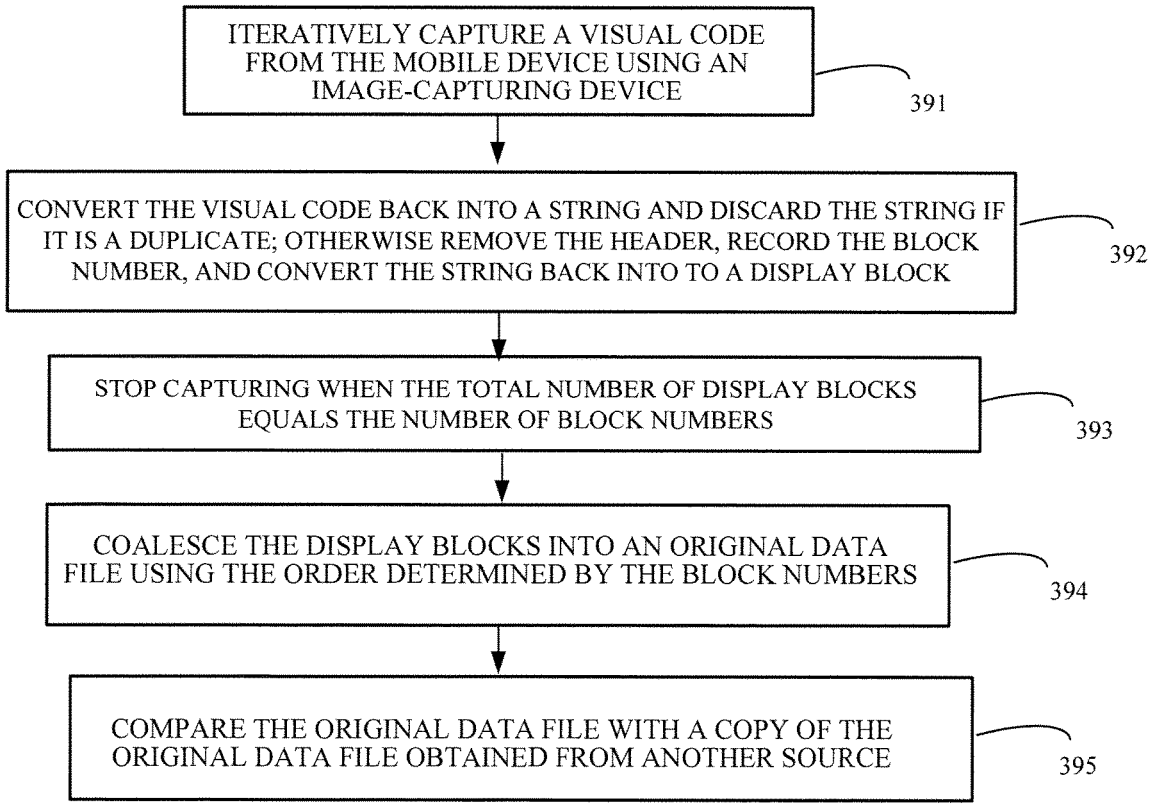

FIG. 3E is a flowchart of a process for transferring an original data file (e.g., an image file) and a certificate from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 3E, software on a mobile device (e.g., mobile device 102 in FIG. 1A, which might be smartphone) partitions an original data file (e.g., an image file) and a certificate (e.g., a certificate certifying the original data file (e.g., an image file)) into a series of display blocks of at least a specified size, e.g., as determined by the size limitations of a standard for a visual code such a QR code, in operation 381. Then in operation 382, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 383, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 384, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 3E (at the bottom of the figure below the dashed dividing line), software on an image-scanning device (e.g., image-scanning device 103 in FIG. 1A, which might be a smartphone, a kiosk, a handheld scanner, etc.) iteratively captures a visual code from the mobile (or sending) device, in operation 391. Then in operation 392, that software converts the visual code back into a string and discards the string if it is a duplicate. Otherwise the software removes the header, records the block number, and converts the string back into to a display block, in an example embodiment. In operation 393, the software stops capturing when the total number of display blocks equals the number of block numbers and, in operation 394, the software coalesces (or combines) the display blocks into an original data file (e.g., an image file) and a certificate using the order determined by the block numbers, in an example embodiment. And in operation 395, the software compares the original data file (e.g., an image file) and the certificate with copies (e.g., identical copies) of the original data file (e.g., an image file) and the certificate obtained from another source, e.g., a state department of motor vehicles, the U.S. State Department, the Federal Bureau of Investigations, a block chain, an airline, etc.

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

Figure 3F:
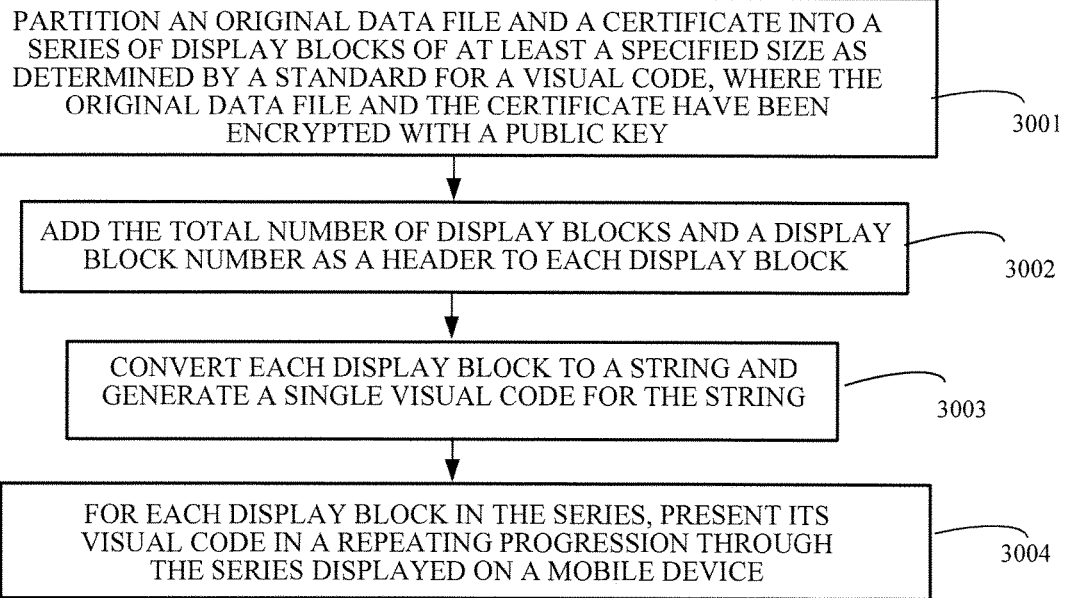
FIG. 3F is a flowchart of a process for transferring an encrypted original data file (e.g., an image file) and certificate from a mobile device to an image-capturing device, in accordance with an example embodiment.
Figure 3F:
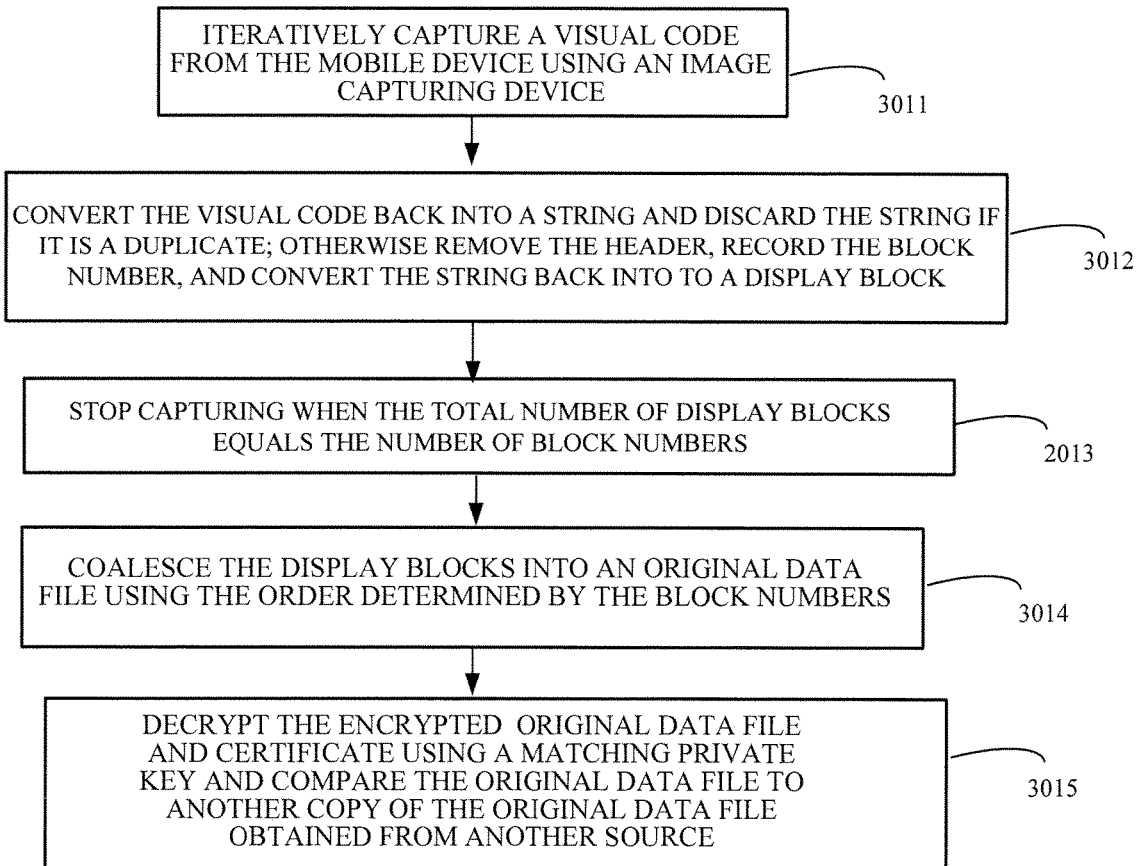

FIG. 3F is a flowchart of a process for transferring an encrypted original data file (e.g., an image file) and certificate from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 3F, software on a mobile device (e.g., mobile device 102 in FIG. 1A, which might be smartphone) partitions an original data file (e.g., an image file) and a certificate (e.g., a certificate certifying the original data file (e.g., an image file)) into a series of display blocks of at least a specified size, e.g., as determined by the size limitations of a standard for a visual code such a QR code, in operation 3001. The original data file (e.g., an image file) has been encrypted with a public key, e.g., the public key of the user of the image-capturing device. In operation 3002, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 3003, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 3004, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 3F (at the bottom of the figure below the dashed dividing line), software on an image-scanning device (e.g., image-scanning device 103 in FIG. 1A, which might be a smartphone, a kiosk, a handheld scanner, etc.) iteratively captures a visual code from the mobile (or sending) device, in operation 3011. Then in operation 3012, that software converts the visual code back into a string and discards the string if it is a duplicate. Otherwise the software removes the header, records the block number, and converts the string back into to a display block, in an example embodiment. In operation 3013, the software stops capturing when the total number of display blocks equals the number of block numbers and, in operation 3014, the software coalesces (or combines) the display blocks into an original data file (e.g., an image file) and a certificate using the order determined by the block numbers, in an example embodiment. And in operation 3015, the software decrypts the encrypted original data file (e.g., an image file) using a private key that matches the public key used to encrypt the original data file (e.g., an image file) and compares the original data file (e.g., an image file) with a copy (e.g., an identical copy) of the original data file (e.g., an image file) and the certificate obtained from another source, e.g., a state department of motor vehicles, the U.S. State Department, the Federal Bureau of Investigations, a block chain, an airline, etc.

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping.

In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

FIG. 3G is a flowchart of a process for transferring a digitally-signed original data file (e.g., an image file) and certificate from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 3G, software on a mobile device (e.g., mobile device 102 in FIG. 1A, which might be smartphone) partitions an original data file (e.g., an image file) and a certificate (e.g., a certificate certifying the original data file (e.g., an image file)) into a series of display blocks of at least a specified size, e.g., as determined by the size limitations of a standard for a visual code such a QR code, in operation 3021. The original data file (e.g., an image file) has been digitally signed with a private key, e.g., the private key of the user of the mobile device. In operation 3022, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 3023, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 3024, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 3G (at the bottom of the figure below the dashed dividing line), software on an image-scanning device (e.g., image-scanning device 103 in FIG. 1A, which might be a smartphone, a kiosk, a handheld scanner, etc.) iteratively captures a visual code from the mobile (or sending) device, in operation 3031. Then in operation 3032, that software converts the visual code back into a string and discards the string if it is a duplicate. Otherwise the software removes the header, records the block number, and converts the string back into to a display block, in an example embodiment. In operation 3033, the software stops capturing when the total number of display blocks equals the number of block numbers and, in operation 3034, the software coalesces (or combines) the display blocks into an original data file (e.g., an image file) and a certificate using the order determined by the block numbers, in an example embodiment. And in operation 3035, the software hashes another copy of the original data file (e.g., an image file) and certificate and uses them and the public key that matches the private key used to digitally sign the original data file (e.g., an image file) and certificate to verify (1) the signed original data file (e.g., an image file) and certificate and (2) the digital signature, using a verification algorithm (e.g., the RSA verification algorithm).

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

Figure 3H:
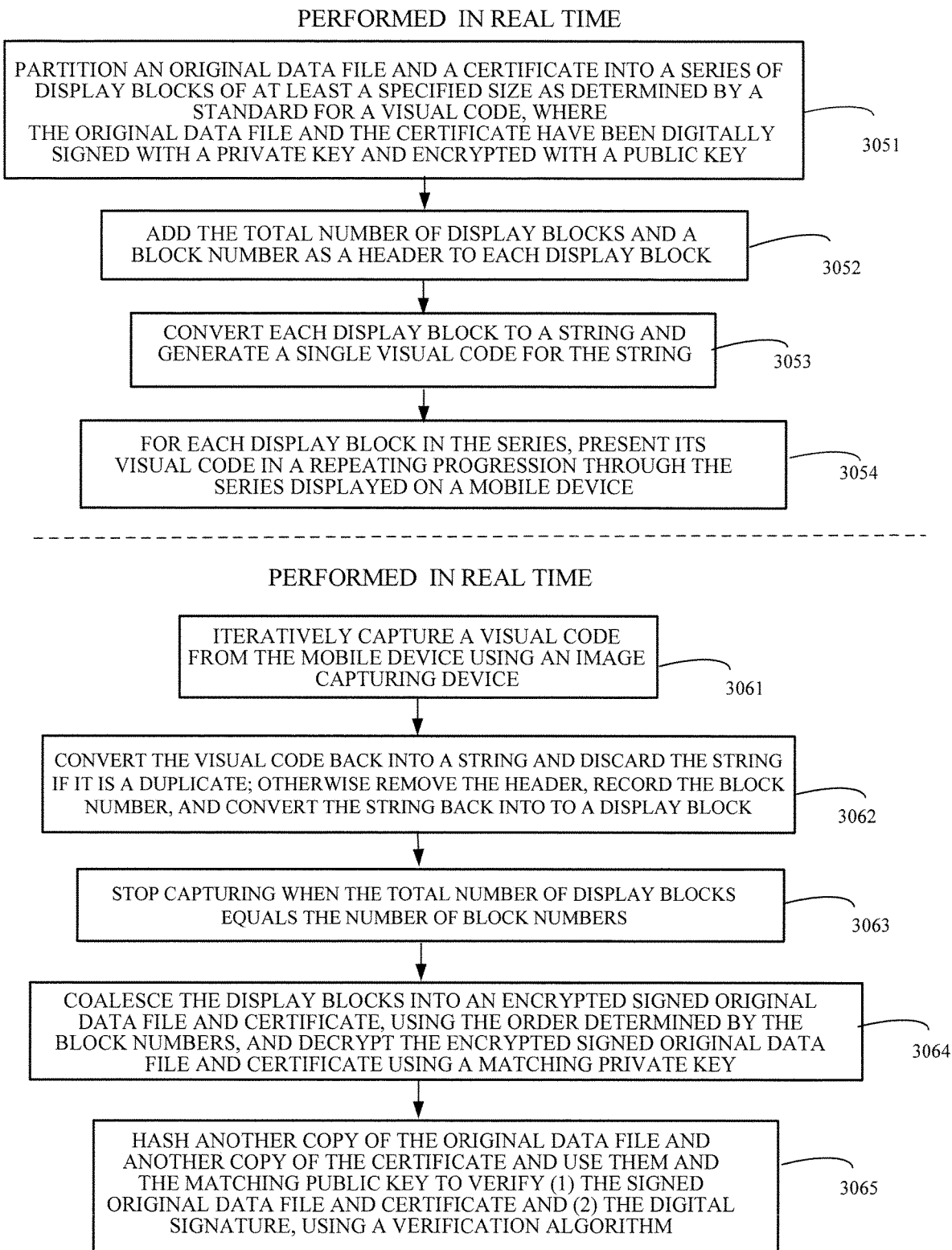
FIG. 3H is a flowchart of a process for transferring a digitally-signed and encrypted original data file (e.g., an image file) and certificate from a mobile device to an image-capturing device, in accordance with an example embodiment.

FIG. 3H is a flowchart of a process for transferring an encrypted and digitally-signed original data file (e.g., an image file) and certificate from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 3H, software on a mobile device (e.g., mobile device 102 in FIG. 1A, which might be smartphone) partitions an original data file (e.g., an image file) and a certificate (e.g., a certificate certifying the original data file (e.g., an image file)) into a series of display blocks of at least a specified size, e.g., as determined by the size limitations of a standard for a visual code such a QR code, in operation 3051. The original data file (e.g., an image file) has been digitally signed with a private key, e.g., the private key of the user of the mobile device, and encrypted with a public key, e.g., the public key of the user of the image-capturing device. In operation 3052, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 3053, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 3054, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 3H (at the bottom of the figure below the dashed dividing line), software on an image-scanning device (e.g., image-scanning device 103 in FIG. 1A, which might be a smartphone, a kiosk, a handheld scanner, etc.) iteratively captures a visual code from the mobile (or sending) device, in operation 3061. Then in operation 3062, that software converts the visual code back into a string and discards the string if it is a duplicate. Otherwise the software removes the header, records the block number, and converts the string back into to a display block, in an example embodiment. In operation 3063, the software stops capturing when the total number of display blocks equals the number of block numbers. In operation 3064, the software coalesces (or combines) the display blocks into an original data file (e.g., an image file) and a certificate using the order determined by the block numbers and decrypts the original data file (e.g., an image file) and the certificate with a private key that matches the public key that was used encrypt the original data file (e.g., an image file), in an example embodiment. Then in operation 3065, the software hashes another copy of the original data file (e.g., an image file) and the certificate and uses them and the public key that matches the private key used to digitally sign the original data file (e.g., an image file) to verify (1) the signed original data file (e.g., an image file) and certificate and (2) the digital signature, using a verification algorithm (e.g., the RSA verification algorithm).

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

Figure 4A:
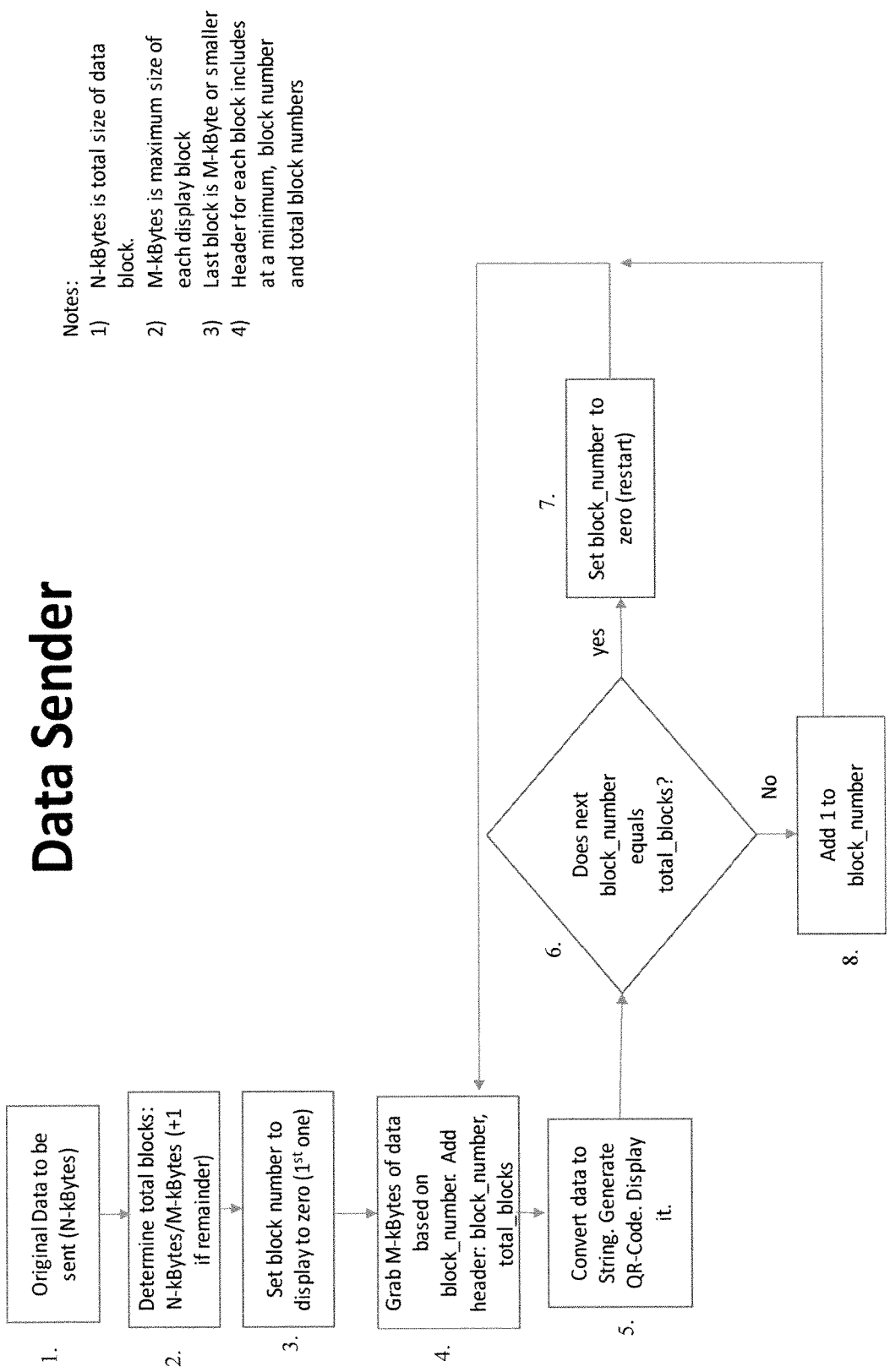
FIG. 4A is a flowchart for a process for partitioning a data block into an ordered series of smaller data blocks, in accordance with an example embodiment.

FIG. 4A is a flowchart for a process for partitioning an original data file into an ordered series of smaller display blocks, in accordance with an example embodiment. In an example embodiment, all of the operations in this process might be performed in real time or near real time by software (e.g., applications or apps distributed by a server at a website) running on the mobile device depicted in the above figures. In an alternative example embodiment, some or all of the operations in this process might be performed in real time or near real time by software running on a server at a website. Also, in an example embodiment, some of the operations in this process might be performed by one thread (e.g., a thread of execution in a computer-program process) and other operations in this process might be performed by another thread.

As depicted in FIG. 4A, software on a mobile device (e.g., mobile device 102 in FIG. 1A, which might be smartphone) is a data sender. In operation 1, that software determines that the original data file (e.g., an image file) to be sent has a size of N-kBytes (or N kilobytes). In operation 2, the software calculates a count variable, total_blocks (the number of total display blocks) by dividing N-kBytes by a maximum size of M-kBytes (or M kilobytes) for each display block by M-kBytes and incrementing by one if there is any remainder. In operation 3, the software sets block_number (the current block number) for the initial display block to zero. Then in operation 4, the software gets the first M-kBytes of the original data file and adds a header that includes the block_number (which is zero) and total_display blocks calculated in operation 2. In operation 5, the software converts the display block with its header into a string, uses the string to generate a QR code, and then displays it as described above on the mobile device. In operation 6, the software determines whether the next block_number (e.g., block_number plus one) equals total_blocks. If so, the software sets block_number to zero, in operation 6, otherwise the software increments block_number by one and returns to operation 4 to get the next M-kBytes of the original data file.

Figure 4B:
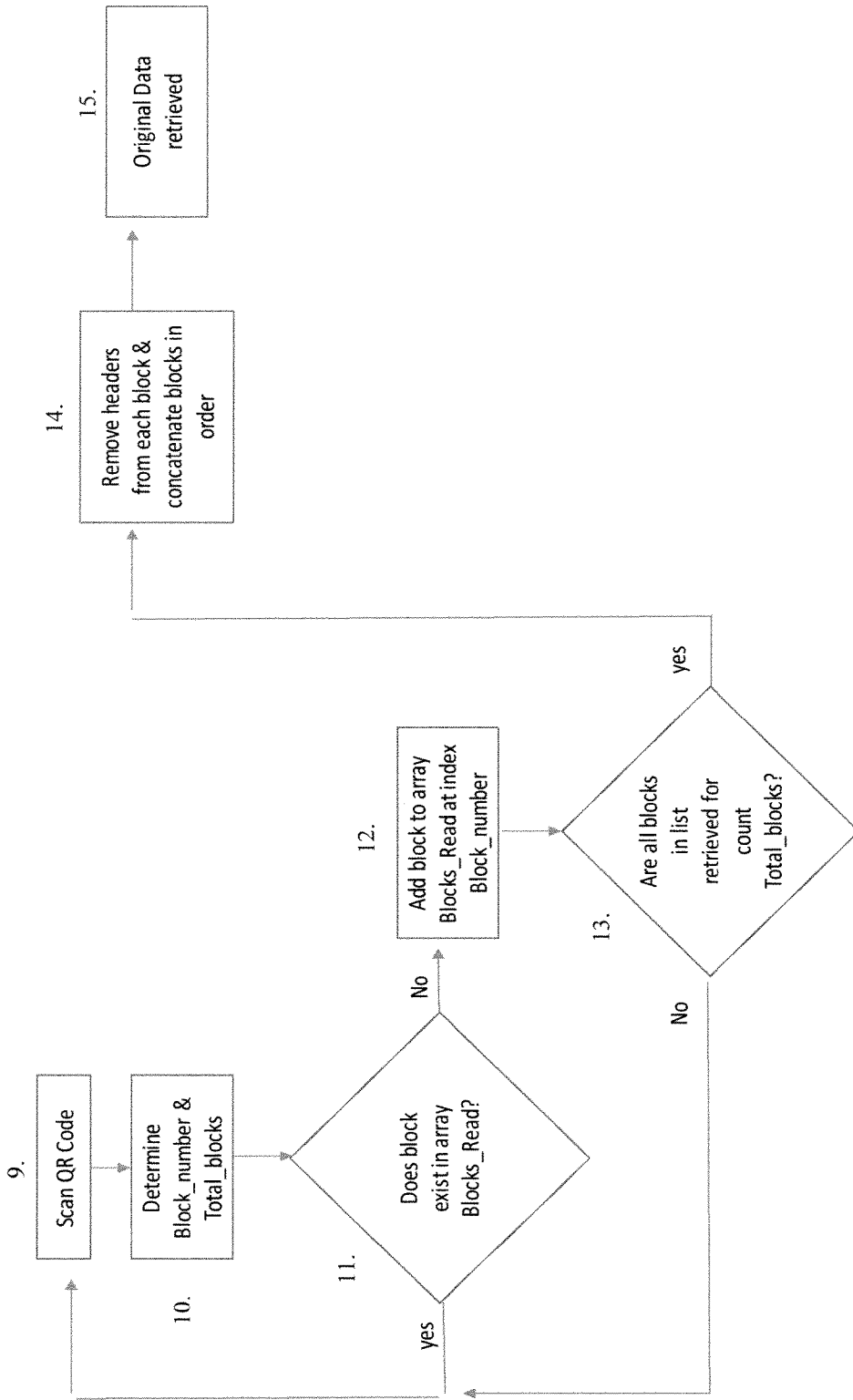
FIG. 4B is a flowchart for a process for coalescing a data block from captured smaller data blocks, in accordance with an example embodiment.

FIG. 4B is a flowchart for a process for coalescing a data block from captured smaller display blocks, in accordance with an example embodiment. In an example embodiment, all of the operations in this process might be performed in real time or near real time by software (e.g., applications or apps distributed by a server at a website) running on the image-capturing device depicted in the above figures. In an alternative example embodiment, some or all of the operations in this process might be performed in real time or near real time by software running on a server at a website. Also, in an example embodiment, some of the operations in this process might be performed by one thread (e.g., a thread of execution in a computer-program process) and other operations in this process might be performed by another thread.

As depicted in FIG. 4B, software on an image-capturing device (e.g., mobile device 102 in FIG. 1A, which might be smartphone, kiosk, etc.) is a data capturer. In operation 9, that software scans a visual code (such as a QR code) that is displayed by a data sender (e.g., a mobile device). In operation 10, the software converts the QR code into a string and determines block_number and total_blocks from the resulting header. In operation 11, the software determines whether the block_number is already present in an array (Blocks_Read) of display block numbers that holds the block number of all of the unique display blocks which have been captured so far. If block_number is already present in the array, the software discards block_number and returns to operation 9. If block_number is not already present in the array, the software adds block_number to the array using block_number as an index, in operation 12, and proceeds to operation 13, where the software determines whether all display blocks have been captured, e.g., whether the array is full. If the array is not full, the software returns to operation 9. If the array is full, the software removes the header from each display block and coalesces (e.g., concatenates them in order) them, in operation 14. In operation 15, the software stores the original data file (e.g., in volatile memory or persistent storage) for later use, comparison or verification.

FIG. 5A illustrates a series of headers that might be used when partitioning an original data file (e.g., an image file), in accordance with an example embodiment. In the figure, each of the headers in the series 501 includes both a count of the total number of display blocks resulting from the partitioning of an original data file (e.g., an image file), namely 10, as well a single ordered block number, namely, 0, 1, 2, 3, 4, 5, 6, 7, 8, or 9. As shown in FIGS. 3A and 3B above, the total number of blocks and the ordered block numbers might be determined by software on a mobile device (e.g., a smartphone) and used by software on an image-scanning device (e.g., a smartphone, a kiosk, a hand-held scanner, etc.) to reconstruct the original data file, in an example embodiment.

FIG. 5B illustrates a process for capturing a series of display blocks, in accordance with an example embodiment. The top of the figure (I) shows a series of ten display blocks that result from partitioning on a mobile device (e.g., a smartphone) of an original data file (e.g., an image file) into multiple display blocks less than a maximum size, e.g., as determined by a standard for a visual code. As indicated in the figure, the series is initially ordered by the block number assigned to each display block. The middle of the figure (II) shows the display blocks as they might appear in an array after they are captured by an image-capturing device (e.g., a smartphone, kiosk, etc.) over time. As indicated in the figure, the display blocks in the array are no longer in the initial order. The bottom of the figure (III) shows the display blocks back in their initial order on the image-capturing device prior to coalescing (e.g., ordered concatenation) back into the original data file (e.g., an image file).

In one embodiment, the ShoCard Identity Platform is a technology layer that interacts with a blockchain. The block-chain can then securely hold data used for certifying identity transactions. But what is a blockchain? You may know that that the technology forms the heart of the cryptocurrency, Bitcoin. But the blockchain technology is used by several integrated systems provided by ShoCard, e.g., for systems other than currency transactions.

In one use example, to register with ShoCard, a certification process is processed. In one embodiment, you can scan a drivers license or passport, and the app grabs the individual field within that, such as your name, license number, passport number, date of birth (or other data), can be gathered individually. The data is then processed to produce a hash of the data. In this example, the private key that's on the mobile device can be used to create a digital signature of that hash, and that's the piece of data that is stored to the blockchain. In one configuration, the various fields are put together in one record to create an ID for that user.

If the user then provides the raw data with a public key and a pointer to that record on the blockchain, the data can be verified. This provides a correlation between the data that the user has on the mobile device and what's on the blockchain.

In still other embodiments, following the registration process, users can be certified by some other trusted party such as a bank or KYC checking company, which then issues a certification for the user. By way of example, these certification can use their own private key to write the records on the blockchain, pointing to that users record entry that's also on the blockchain. We call that your ShoCard ID, or generally, the User ID. In this example, there are two steps: one is the registration where we put hash signatures of the individual fields on the blockchain the second one is a certification.

Figure 6:
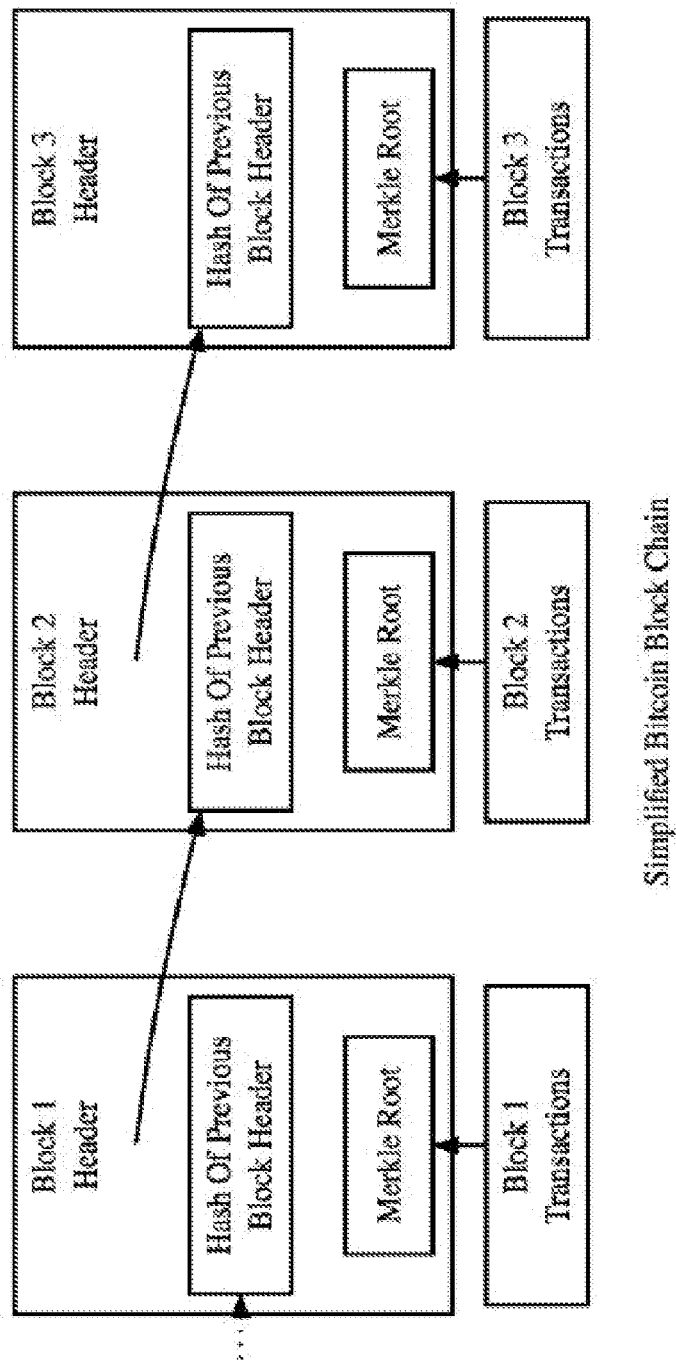
FIG. 6 illustrates the implementation of a blockchain to ensure the integrity of the data embedded within, in accordance with one embodiment of the present disclosure.

The illustration above (FIG. 6) shows a simplified version of a block chain. A block of one or more new transactions is collected into the transaction data part of a block. Copies of each transaction are hashed, and the hashes are then paired, hashed, paired again, and hashed again until a single hash remains, the merkle root of a merkle tree. The merkle root is stored in the block header. Each block also stores the hash of the previous block's header, chaining the blocks together. This ensures a transaction cannot be modified without modifying the block that records it and all following blocks.

Understanding the basics discussed above, the system and methods process operations referred to as "sealing" and "certifying." Sealing is the process of hashing and encrypting your ShoCard data and storing it in the blockchain. Once it is sealed in the blockchain, the data becomes a permanent record. You can change your ShoCard, but you will have to re-Seal it, and create a new blockchain record. No readable information is stored in the blockchain, only an indecipher-able hash that can only be unlocked by your private key, which is always controlled by the user.

"Certifying" your ShoCard is the process of another party acknowledging the accuracy of your ShoCard and marking it so they will recognize it as accurate again in the future without having to see any other evidence of identity beyond your ShoCard. To certify a ShoCard, you send your encrypted ShoCard to the certifier. They decrypt is and match the hash you sent them to the hash stored in the blockchain. This proves you have the private keys that created both records. If they are satisfied that you are who you say you are, they can create a new record with their own private keys that references your ShoCard. In the future, when you present your ShoCard, they will check their certification to make sure you are presenting the same ShoCard they previously certified.

Figure 7:
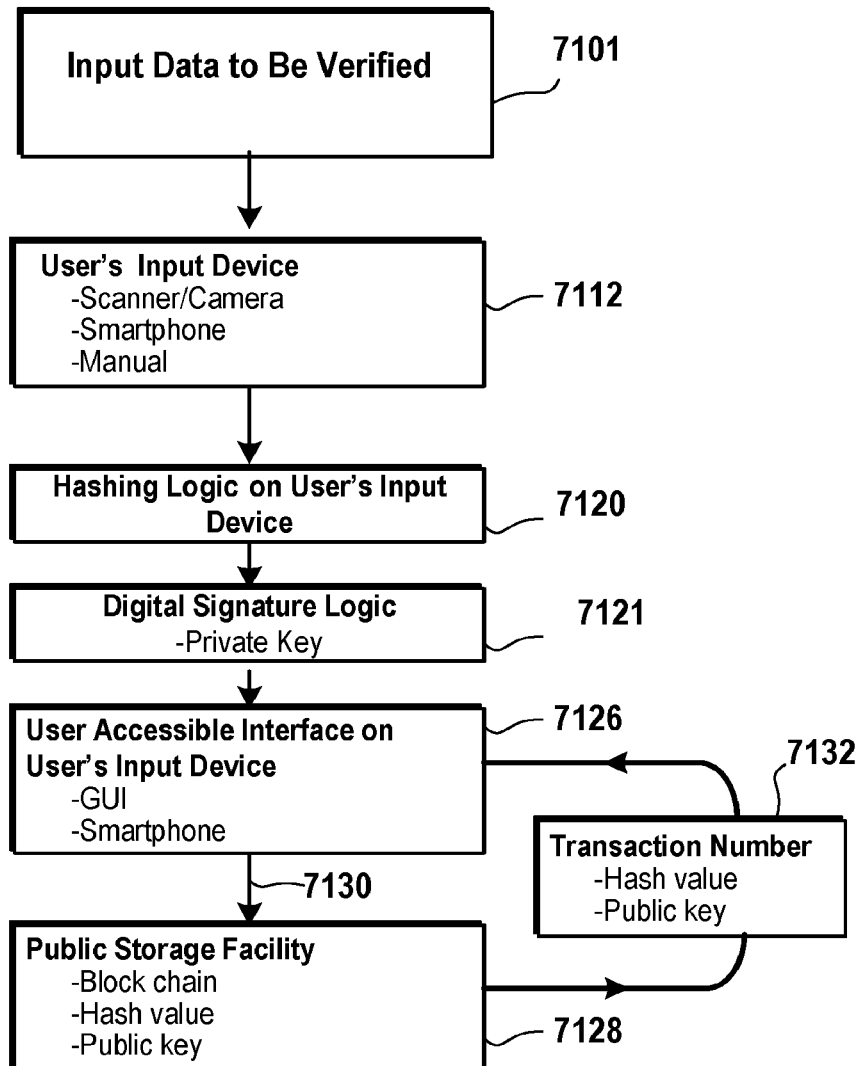
FIG. 7 shows a simplified block diagram of a system and method for sealing any input data in a public storage facility.

FIG. 7 shows a simplified block diagram of a system and method for sealing any input data in a public storage facility. As noted above, the operations to be performed by the hashing logic 7120 can proceed directly after receiving the user information from the input device 7112. In this embodiment, the hashing logic 7120 is used for hashing the input data (e.g., personal information collected) to provide or generate a hash value. The hash value is sometimes referred to as "hash data," that is generated by an algorithm. In an example embodiment, hashing logic 7120 might be software, firmware, hardware, or any combination thereof, and consist of one or more hashing algorithms, e.g., a Secure Hash Algorithm (SHA) algorithm. Hashing logic 7120 passes the hash value to digital-signature logic 7121, which performs a digital signature on the hash value, using the private key on the input device 7112. In an example embodiment, digital-signature logic 7121 might be a component (or module) of encryption logic. In other embodiments, the digital-signature logic 7121 may be defined by separate code, firmware, and/or hardware.

In one embodiment, the digital-signature logic 7121 then passes the signed hash value and the public key to a user accessible interface 7126 (e.g., a graphical user interface or GUI), which might be other software running on the input device 7112. In an example embodiment, the user accessible interface 7126 might be part of an application or app that includes encryption logic, hashing logic 7120, and digital-signature logic 7121, and/or other modules or code. The user accessible interface 7126 might be used by the user to transmit the digitally signed hash value and the public key to a public storage facility 7128 via a line 7130, and receives back from the public storage facility 7128 a transaction number 7132 corresponding to the transmitted hash value and public key. In an alternative example embodiment, only the signed hash value might be transmitted to public storage facility 7128 by the user and persons retrieving the signed hash value might obtain the public key from elsewhere (e.g., the user, a public database, an Internet repository, a website, etc.). As is well known, there is no need to keep public keys secure, and in fact, the algorithms using public/private key pairs are design to enable full sharing of public keys. The private key, on the other hand, must be kept secure, as noted above.

In one embodiment, the public storage facility 7128 can take the form of a block chain (e.g., in a bitcoin online payment system) or any other public or private distributed database. The public storage facility 7128 is connected to a communication link via a line and can be adapted to communicate over a public computer network, the internet, an intranet, an extranet, or any private communication network. Broadly speaking, the public storage facility 7128 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 7112 to the public storage facility 7128 for storage. The user accessible interface 7126 is thus adapted to "seal" the signed hash value and the public key in the public storage facility 7128. In one embodiment, once the hash value, and, optionally, the public key of the user is written to the block chain in a transaction, a later verification may be made if another party is able to hash the same input data.

Figure 8:
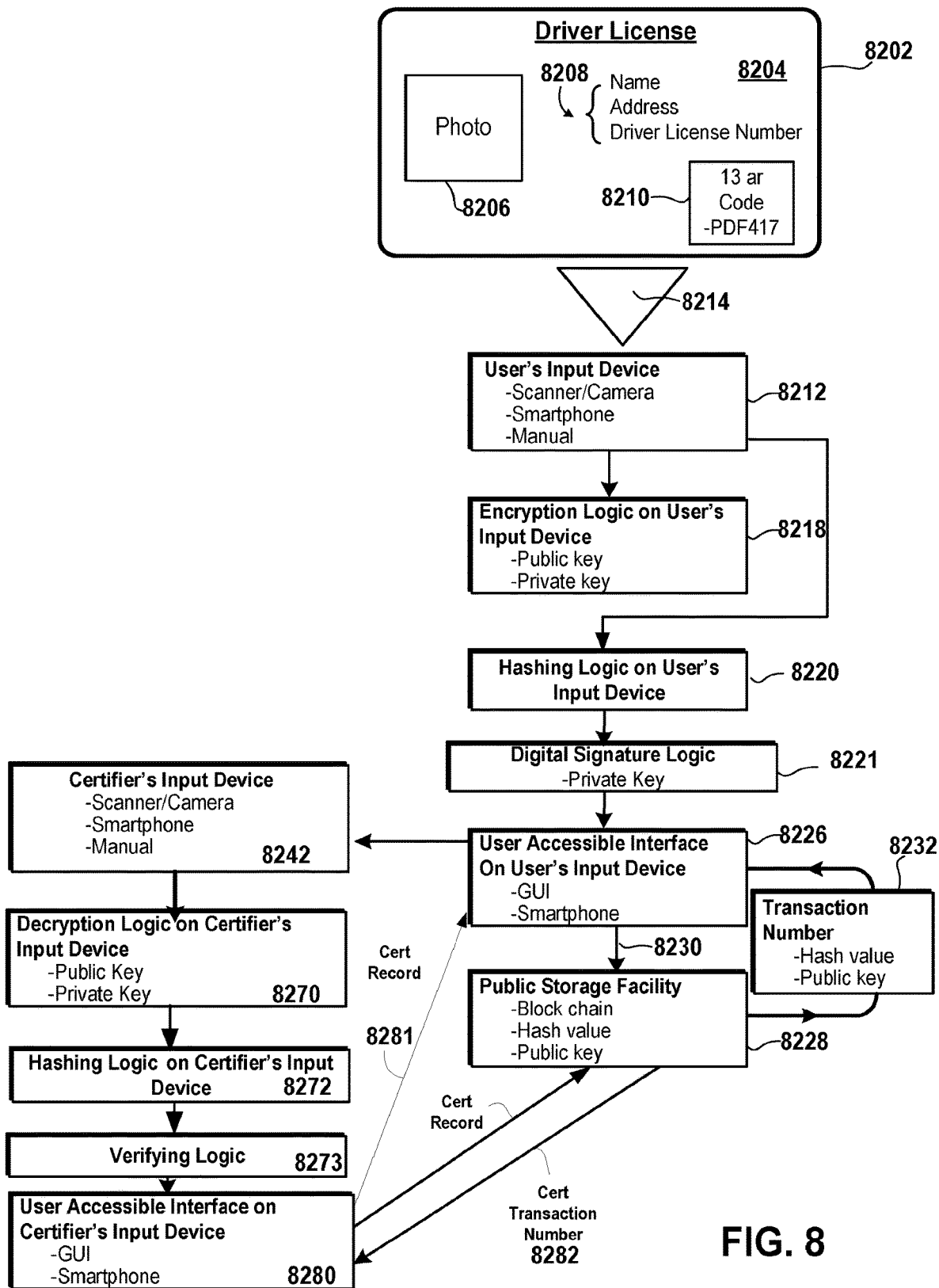
FIG. 8 shows a simplified block diagram of a system and method for certifying an identity of a person.

FIG. 8 shows a simplified block diagram for a certification method for managing the identity of a user in a public storage facility 8228. By way of example, an identification card 8202 may be used. In other embodiments, other forms of identification, which may be digital or non-digital may be used. In the example of the identification card 8202, personal data 8204 is contained thereon, which identifies the user. The input data can include a photo 8206 of the user; the user's name, address and driver license number 8208, and/or a bar code 8210 or similar computer code for storing, scanning and/or retrieving additional data. Such coding can include PDF417 codes, QR codes, and other such codes. However, it is not necessary to have such code and the identification card may only have human-readable text strings. As noted above, the identification card 8202 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 8202 can be a government issued form of identification such as a driver license, passport, employee badge, military identification, political documentation, or the like. The identification card 8202 can also be a privately issued form of identification such as a student ID, library card, social club car, or any other form of identification issued by a third party.

In one embodiment, as indicated by triangle 8214, an input device 8212 may be used to input such personal data from the identification card 8202 to provide input data. Input device 8212 can take many forms. For example, input device 8212 can be a digital scanner, digital camera, or smartphone (e.g., with the camera commonly found in smartphones) for reading data from the identification card 8202, including any codes appearing on the card 8202. The input device 8212 can also be a device for manually inputting personal data such as a keyboard, touchscreen, voice recognition device, handwriting recognition device, or other manual input device.

As shown in FIG. 8, the input data can be optionally encrypted by encryption logic 8218 and securely stored. In one implementation, the input data is transferred directly to hashing logic 8220, without passing through encryption logic 8218. For ease of understanding, the operations of the optional encryption logic 8218 will be discussed first, and then the operations processed by the hashing logic 8220. As such, the process may proceed directly from receiving the user information via 8212 to the hashing logic 8220.

The input data collected from the input device 8212 (e.g., a user's smartphone) is passed to encryption logic 8218 on input device 8212. In an example embodiment, encryption logic 8218 might include software, firmware, hardware, or any combination thereof, and consist of one or more encryption algorithms, e.g., an RSA encryption algorithm. Encryption logic 8218 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 8212 for added security. It can then only be accessed with the private key of the user on the input device 8212, which might be stored in a more secure part of input device 212, e.g., "the Keychain", if input device 8212 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 8212. It should be understood that the private key may be stored on another device, but similar or additional security should be processed to ensure that the private key is not compromised.

As noted above, the operations to be performed by the hashing logic 8220 can proceed directly after receiving the input data from the input device 8212. In this embodiment, the hashing logic 8220 is used for hashing the input data (or selected fields of the input data or personal data) to provide or generate a hash value. The hash value is sometimes referred to as "hash data," that is generated by an algorithm. In an example embodiment, hashing logic 8220 might be software, firmware, hardware, or any combination thereof, and consist of one or more hashing algorithms, e.g., a Secure Hash Algorithm (SHA) algorithm. Hashing logic 8220 passes the hash value to digital-signature logic 8221, which performs a digital signature on the hash value, using the private key on the input device 8212. In an example embodiment, digital-signature logic 8221 might be a component (or module) of encryption logic 8218. In other embodiments, the digital-signature logic 8221 may be defined by separate code, firmware, and/or hardware.

In one embodiment, the digital-signature logic 8221 then passes the signed hash value and the public key to a user accessible interface 8226 (e.g., a graphical user interface or GUI), which might be other software running on the input device 8212. In an example embodiment, the user accessible interface 8226 might be part of an application or app that includes encryption logic 8218, hashing logic 8220, and digital-signature logic 8221, and/or other modules or code. The user accessible interface 8226 might be used by the user to transmit the digitally signed hash value and, optionally, the public key to a public storage facility 8228 via a line 8230, and receive back from the public storage facility 8228 a transaction number 8232 corresponding to the transmitted hash value and public key.

In one embodiment, the public storage facility 8228 can take the form of a block chain (e.g., in a bitcoin online payment system) or any other public or private distributed database. The public storage facility 8228 is connected to a communication link via a line and can be adapted to communicate over a public computer network, the internet, an intranet, an extranet, or any private communication network. Broadly speaking, the public storage facility 8228 is accessible by any device that has an Internet connection over a network.

As indicated above, in an example embodiment, the input data (or selected fields of the input data) might be hashed and the resulting hash value might be signed with a digital signature, created using a private key paired with a public key, before transmission, along with, optionally, the public key, from the input device (e.g., a user's smartphone) 8212 to the public storage facility 8228 for storage. The user accessible interface 8226 is thus adapted to "seal" the signed hash value and the public key in the public storage facility 8228. In one embodiment, once the hash value, and, optionally, the public key of the user is written to the block chain in a transaction, a later verification may be made if another party is able to hash the same input data.

The user accessible interface 8226 (e.g., a GUI) can be controllable by the user of the input device 8212 to encrypt and provide the transaction number 8232, the input data (or selected fields of the input data), and, optionally, the public key to an input device 8242 (e.g., a smartphone) of a certifier. In an example embodiment, the encryption might be performed by the encryption logic 8218 using a public key of a certifier paired with a private key of the certifier. Then, coding logic on the input device 8212 might code the encrypted transaction number 8232, the input data (or selected fields of the input data), and, optionally, the public key into a barcode or QR code and the certifier might use input device 8242 to scan the barcode or QR code and decode it to gain access to the encrypted items. Thereafter, the certifier might decrypt the encrypted items using the private key of the certifier and verify them, e.g., using a "verify" function call to an RSA algorithm as explained in further detail below.

Once the certifier's input device 8242 receives the barcode or QR code, decoding logic on the certifier's input device 8212 might decode the barcode or QR code and decryption logic 8270 on the certifier's input device 8242 might use the certifier's private key to decrypt the encrypted items. In an example embodiment, decryption logic 8270 might be a component (or module) of more general encryption logic. In one embodiment, the decrypted input data (or selected fields of the input data) might be hashed into a hash value by hashing logic 8272 on the certifier's input device 8242, using the same hashing algorithm that was used to create the hash value that was digitally signed by the user. And the decrypted transaction number 8232 might be used by a user accessible interface 8280 (e.g., a GUI) to access the public storage facility 8228 (e.g., the block chain) and retrieve the signed hash value and public key of the user. The retrieved signed hash value, the generated hash value, and the retrieved or obtained public key might then be input to verifying logic 8273 for verification (e.g., through a "verify" function call to an RSA algorithm), which outputs a "true" value if the two hash values are the same and the public key is associated with the signature or a "false" value if the two hash values are not the same or the public key is not associated with the signature. In an example embodiment, verifying logic 8273 might be a component (or module) of decryption logic 8270. In another embodiment, the verifying logic 8273 may be a separate module, software, firmware and/or hardware. As indicated above, in an example embodiment, the public key of the user might be obtained from some other source than the public storage facility 8228 (e.g., from the user), in an example embodiment.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Having provided this detailed description, it will be apparent that modifications and variations are possible without departing from the scope of the invention defined in the appended claims. When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. In view of the above, it will be seen that the several objects of the invention are achieved and other advantageous results attained. As various changes could be made in the above systems without departing from the scope of the invention, it is intended that all matter contained in the above description and shown in the accompanying drawings shall be interpreted as illustrative and not in a limiting sense.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising operations of:
    partitioning a data file into a plurality of data segments;
    converting the plurality of data segments into a series of display blocks, wherein each display block includes a corresponding header identifying a position within the series of display blocks; and
    iteratively displaying each of the display blocks in the series of display blocks in a repeating progression on a screen of a mobile device for capture by an image-capturing device which is configured to coalesce the captured display blocks back to the data file as a coalesced data file, using an order determined from corresponding headers;
    wherein the image-capturing device is configured to verify integrity of the coalesced data file using information accessed from a blockchain database based on a hash of the coalesced data file and a seal accessed from the blockchain database that is generated from the data file that is hashed and signed using a private key of the mobile device in order to verify that the coalesced data file that is hashed matches the contents of the seal using a public key paired with the private key of the mobile device and a verification algorithm.

2. The method of claim 1, wherein the corresponding header includes an identifying block number and a count of the display blocks in the series of display blocks.

3. The method of claim 1, wherein the partitioning of the data file includes selecting a size for each of the plurality of data segments to enable correspondence to a predetermined size of the display blocks in the series of display blocks.

4. The method of claim 1, wherein the iteratively displaying each of the display blocks in the series of display blocks causes a rotation of the display blocks displayed in a loop that repeats until each of the display blocks in the series of display blocks are confirmed captured by the image-capturing device.

5. The method of claim 1, wherein each of the display blocks in the series of display blocks is a visual code comprising a QR code or bar code.

6. The method of claim 1, further comprising:
    encrypting the data file using a public key of the image-capturing device before partitioning the data file that is encrypted into the plurality of data segments,
    wherein the image-capturing device is configured to coalesce the captured display blocks and decrypt the captured display blocks that are coalesced into the coalesced data file using a private key that is paired with the public key of the image-capturing device.

7. The method of claim 1, further comprising:
    including a certification with the data file before partitioning into the plurality of data segments, wherein the certification certifies the data file and is used to verify the validity of the data file, the certification based on contents of the data file and the seal stored in the blockchain database.

8. The method of claim 1, wherein the image-capturing device is configured as a kiosk.

9. The method of claim 1, wherein the image-capturing device is provided in association with an airline.

10. The method of claim 1, wherein the data file is an image file.

11. The method of claim 1, wherein the data file contains biometric data.

12. The method of claim 1, wherein the blockchain database receives data for storage from a plurality of entities, the data received for storage is configured to be processed to generate a transaction record that is dependent on previous data stored to the blockchain database, wherein the transaction record being dependent on previous data stored to the blockchain database ensures that the data stored to the blockchain database is not modifiable, as later data stored to the blockchain database continues to be dependent on previous data stored to the blockchain database.

13. A computer system comprising:
    a processor; and
    memory coupled to the processor and having stored therein instructions that, if executed by the computer system, cause the computer system to execute a method comprising:
    partitioning a data file into a plurality of data segments;
    converting the plurality of data segments into a series of display blocks, wherein each display block includes a corresponding header identifying a position within the series of display blocks; and
    iteratively displaying each of the display blocks in the series of display blocks in a repeating progression on a screen of a mobile device for capture by an image-capturing device which is configured to coalesce the captured display blocks back to the data file as a coalesced data file, using an order determined from corresponding headers;
    wherein the image-capturing device is configured to verify integrity of the coalesced data file using information accessed from a blockchain database based on a hash of the coalesced data file and a seal accessed from the blockchain database that is generated from the data file that is hashed and signed using a private key of the mobile device in order to verify that the coalesced data file that is hashed matches the contents of the seal using a public key paired with the private key of the mobile device and a verification algorithm.

14. The computer system of claim 13, wherein in the method the partitioning of the data file includes selecting a size for each of the plurality of data segments to enable correspondence to a predetermined size of the display blocks in the series of display blocks.

15. The computer system of claim 13, wherein in the method the iteratively displaying each of the display blocks in the series of display blocks causes a rotation of the display blocks displayed in a loop that repeats until each of the display blocks in the series of display blocks are confirmed captured by the image-capturing device.

16. The computer system of claim 13, wherein in the method each of the display blocks in the series of display blocks is a visual code comprising a QR code or bar code.

17. The computer system of claim 13, the method further comprising:
   encrypting the data file using a public key of the image-capturing device before partitioning the data file that is encrypted into the plurality of data segments,
   wherein the image-capturing device is configured to coalesce the captured display blocks and decrypt the captured display blocks that are coalesced into the coalesced data file using a private key paired with the public key of the image capturing device.

18. The computer system of claim 13, the method further comprising:
   including a certification with the data file before partitioning into the plurality of data segments, wherein the certification certifies the data file and is used to verify the validity of the data file, the certification based on contents of the data file and the seal stored in the blockchain database.

19. The computer system of claim 13, wherein the image-capturing device is configured as a kiosk provided in association with an airline.

20. The computer system of claim 13, wherein the data file contains biometric data.

21. A non-transitory computer-readable medium storing a computer program for implementing a method, the computer-readable medium comprising:
   program instructions for partitioning a data file into a plurality of data segments;
   program instructions for converting the plurality of data segments into a series of display blocks, wherein each display block includes a corresponding header identifying a position within the series of display blocks; and
   program instructions for iteratively displaying each of the display blocks in the series of display blocks in a repeating progression on a screen of a mobile device for capture by an image-capturing device which is configured to coalesce captured display blocks back to the data file as a coalesced data file, using an order determined from corresponding headers;
   wherein the image-capturing device is configured to verify integrity of the coalesced data file using information accessed from a blockchain database based on a hash of the coalesced data file and a seal accessed from the blockchain database that is generated from the data file that is hashed and signed using a private key of the mobile device in order to verify that the coalesced data file that is hashed matches the contents of the seal using a public key paired with the private key of the mobile device and a verification algorithm.

22. The computer-readable medium of claim 21, wherein the program instructions for partitioning of the data file includes program instructions for selecting a size for each of the plurality of data segments to enable correspondence to a predetermined size of the display blocks in the series of display blocks.

23. The computer-readable medium of claim 21, wherein the program instructions for iteratively displaying each of the display blocks in the series of display blocks causes a rotation of the display blocks displayed in a loop that repeats until each of the display blocks in the series of display blocks are confirmed captured by the image-capturing device.

24. The computer-readable medium of claim 21, further comprising:
   program instructions for encrypting the data file using a public key of the image-capturing device before partitioning the data file that is encrypted into the plurality of data segments,
   wherein the image-capturing device is configured to coalesce the captured display blocks and decrypt the captured display blocks that are coalesced into the coalesced data file using a private key that is paired with the public key of the image-capturing device.

25. The computer-readable medium of claim 21, further comprising:
   program instructions for including a certification with the data file before partitioning into the plurality of data segments, wherein the certification certifies the data file and is used to verify the validity of the data file, the certification based on contents of the data file and the seal stored in the blockchain database.

26. The computer-readable medium of claim 21, wherein in the method the image-capturing device is configured as a kiosk provided in association with an airline.

27. The computer system of claim 21, wherein the data file contains biometric data.

* * * * *